United States Patent [19]

Kitagawa et al.

[11] Patent Number: 5,819,126
[45] Date of Patent: Oct. 6, 1998

[54] LENS-FITTED PHOTO FILM UNIT AND DATA RECORDING METHOD THEREFOR

[75] Inventors: Kuniharu Kitagawa, Tokyo; Kazuo Kamata, Kanagawa; Yukitsugu Hata, Kanagawa; Sumio Yoshikawa, Kanagawa, all of Japan

[73] Assignee: Fuji Photo Film Co., Ltd., Kanagawa, Japan

[21] Appl. No.: 784,259

[22] Filed: Jan. 15, 1997

[30] Foreign Application Priority Data

| Jan. 19, 1996 | [JP] | Japan | 8-007539 |
| Jan. 26, 1996 | [JP] | Japan | 8-011943 |
| Feb. 5, 1996 | [JP] | Japan | 8-019061 |

[51] Int. Cl.$^6$ .......................... G03B 17/24; G03B 17/02; G03B 17/26
[52] U.S. Cl. .................. 396/319; 396/6; 396/512
[58] Field of Search .................. 396/6, 207, 208, 396/311, 319, 211, 511, 512

[56] References Cited

U.S. PATENT DOCUMENTS

| 4,443,077 | 4/1984 | Tanikawa | 396/319 |
| 4,978,982 | 12/1990 | Ishikawa et al. | 396/311 |
| 5,032,855 | 7/1991 | Taniguchi et al. | 396/319 |
| 5,142,310 | 8/1992 | Taniguchi et al. | 396/319 |
| 5,349,401 | 9/1994 | Bryant | 396/512 |
| 5,389,983 | 2/1995 | Tsunefuji | 396/512 |
| 5,394,206 | 2/1995 | Cocca | 396/311 |
| 5,434,634 | 7/1995 | Yoshida | 396/319 |
| 5,467,156 | 11/1995 | Ezawa et al. | 396/311 |
| 5,476,232 | 12/1995 | Kataoka et al. | 396/512 |
| 5,601,956 | 2/1997 | Inuiya | 396/6 |
| 5,640,201 | 6/1997 | Inuiya | 396/311 |

FOREIGN PATENT DOCUMENTS

| 54-26721 | 2/1979 | Japan . |
| 2-217829 | 8/1990 | Japan . |
| 4-306628 | 10/1992 | Japan . |
| 6-266053 | 9/1994 | Japan . |
| 7-219021 | 8/1995 | Japan . |
| 8-23671 | 3/1996 | Japan . |
| WO 90/04214 | 4/1990 | WIPO . |

Primary Examiner—Safet Metjahic
Assistant Examiner—Nicholas J. Tuccillo
Attorney, Agent, or Firm—Young & Thompson

[57] ABSTRACT

A lens-fitted photo film unit contains a cartridge shell into which an IC memory is incorporated, and a roll of photo filmstrip having a magnetic recording layer. Unit ID data and date-of-manufacture data are written in the IC memory in the factory. A data recording circuit is provided on a flash circuit board. The data recording circuit is connected to the IC memory through a printed circuit board mounted to a cartridge chamber of the film unit. A finder mask and a photo sensor for detecting the position of the finder mask are mounted in the film unit. The photo sensor is connected to the data recording circuit, to write photographic data corresponding to the output of the photo sensor in the IC memory at each exposure. Before printing, the data written in the IC memory is read to be recorded on the magnetic recording layer of the photo filmstrip by use of an external recording device which is connectable to the IC memory through an interface terminal which is exposed to an exterior of the film unit.

15 Claims, 16 Drawing Sheets

LENS-FITTED PHOTO FILM UNIT AND DATA RECORDING METHOD THEREFOR

BACKGROUND OF THE INVENTION

1. Field of the Invention

The present invention relates to a data recording method for recording photographic data in an IC memory during photography, and on a magnetic recording layer formed on a filmstrip. The present invention relates also to a lens-fitted photo film unit having a data recording device for recording photographic data in an IC memory during photography.

2. Background Arts

A new type photo film cartridge, called IX 240 type or Advanced Photo System type, has recently been put on the market. The IX 240 type film cartridge contains a photo filmstrip having a transparent magnetic recording layer, as is disclosed in December 1994 issue of SHASHIN KOGYO, p.11, published by Shashin Kogyo Shuppan Co. Ltd., International Patent Publication WO 90/04214, and so forth. The magnetic recording layer is used to record photographic data or the like which is produced by the camera, and read it to utilize for printing and other purpose.

The photographic data written on the magnetic recording layer may include exposure data such as shutter speed, aperture size and light source, print format data designating one of standard, panoramic and cine size. If the camera has a device to designate a trimming or clopping range, as disclosed in JPA 54-26721, the trimming range may be included in the print format data. Also, date data or optional character data for printing the date of photograph or the title or comments in addition to the photographed scene.

The photographic data can be read out in a photo-lab. For example, the exposure data is utilized for controlling exposure in printing. The print format data is utilized for automatic setting of the print magnification, the film mask and the paper mask, so that it is possible to automatically make prints in the different formats according to the photographer's request even when the original frames on the filmstrip have a constant size. Since the date data or the character data read out from the magnetic recording layer makes it possible to photographically print character information on the photo paper concurrently with the image printing, those optical data recording devices incorporated in conventional cameras are not necessary. The character data may include data of printing position, printing posture, printing size and printing color, so that it can innovate in the optical data recording for photo-prints.

Camera type data on the magnetic recording layer may be utilized for determining whether print-exposure correction is necessary or not. Recording number-of-print data with such a frame from which a known plural number of prints are to made, permits obtaining the necessary number of prints immediately after the development, so that the photographer need not order extra printing. The magnetic recording layer may be used for recording data in the photo-lab, such as the number of extra prints, print-exposure correction data, and the reception date and reception number of print order.

For the magnetic recording on the photo film, the camera must have a magnetic recording device comprised of a magnetic head and a magnetic head driving circuit. Because the photo film is certainly stiffer than ordinary magnetic audio or video recording tapes, it is necessary to support the magnetic head or the photo film in a specific fashion to maintain the head in proper contact with the magnetic recording layer during the recording. Moreover, because the magnetic recording should be accomplished while the photo film is advanced one frame after each exposure at changeable or unstable speed, it is necessary to adjust the data recording speed to the film advancing speed. Accordingly, the magnetic head driving circuit have to be complicated and expensive.

For the reasons as above, it is commercially impossible to incorporate a magnetic recording device for the photo film into economy type cameras or single-use cameras including lens-fitted photo film units preloaded with unexposed photo film. Hereinafter, the lens-fitted photo film units will be referred to as film units. Without the magnetic recording, the photographer cannot make the best of the IX 240 type film cartridge, though the IX 240 type is preferable for the compact cameras and the film units because it is smaller and lighter than conventional film cartridges.

On the other hand, JPA 56-154720 and JPA 2-217829 disclose a photo film cartridge with an IC memory or semiconductor memory, and a system for recording photographic data as above in the IC memory so as to permit the photographer or the photofinisher to utilize the photographic data. This IC memory system functions substantially in the same way as the above magnetic recording system, and the cost can be lower than the magnetic recording system. Accordingly, it has been studied to introduce the IC memory system into the cheap cameras and the film units.

For example, a data recording circuit for recording data in the IC memory may be provided on the same printed circuit board as the flash circuit of the film unit, and may be supplied from the battery for the flash circuit. In that case, however, it is necessary to wire from the data recording circuit on the flash circuit board to a data recording terminal in a cartridge chamber, to access the IC memory of the photo film cartridge. Wiring is so hard to automate, that it would require manual assembly steps, and raise the manufacturing cost of the film unit. Since the flash circuit board is determined to be reused, the circuit board must be easy to dissemble even if it has the data recording circuit connected to the IC memory. Furthermore, the wiring from the flash circuit board to the cartridge chamber should not remarkably enlarge the size of the film unit.

There is another problem in the IC memory system. Once the photo film is separated from the cartridge shell with the IC memory, it is impossible to correlate the photo film with the photographic data written in the IC memory. For correlation, JPA 2-217829 discloses recording identical or corresponding indicia on both the photo film and the cartridge shell. If the indicia on the photo film or the portion having the indicia is damaged, the correlation becomes impossible. Also, it is necessary to correlate the respective frames on the photo film with the photographic data with reference to other indicia provided for indicating the position or the serial number of each frame, such as notches or bar code.

JPA 4-306628 discloses a film unit attached with a date memory device for storing the date of photographing in an IC memory such as SRAM or EEPROM. The date memory device is removable from the film unit, and includes a clock section and a control section besides the IC memory. The date memory device and the used photo film cartridge are removed from the film unit in the photo-lab. The exposed photo film is developed, and the date memory device is set in a specific photo printer along with the corresponding photo film, so that the date data is read from the IC memory, to print the date of photography in an appropriate position of the photo paper in association with each image.

Alternatively, the date of photography is optically recorded on the photo film before development, based on the date data written in the IC memory. Thereby, the date of photography will always be printed with the image.

It may be possible to provide a memory device in the film unit to write not only date data but also other photographic data in an IC memory of the memory device. However, it is hard to optically record all pieces of photographic data on the photo film before development. Therefore, it is desirable to permit recording the photographic data read from the IC memory on the magnetic recording layer of the photo film.

SUMMARY OF THE INVENTION

A prime object of the present invention is provide a data recording method which permits recording photographic data on the magnetic recording layer of the photo film which is exposed in the film unit or the economy type camera that has no magnetic recording device therein.

Another object of the present invention is to provide a film unit which is able to record data in an IC memory, easy to assemble and dissemble, and thus suitable for reuse.

To achieve the above object, according to the present invention, an IC memory and a data recording device are provided in a unit body of a film unit such that photographic data is written in the IC memory at each exposure through the data recording device.

After the cartridge shell containing a full length of the exposed photo filmstrip therein is removed from the unit body, an external device reads the data from the IC memory of the unit body, to record the data on the magnetic recording layer of the photo filmstrip before printing.

According to a preferred embodiment, data specific to the lens-fitted photo film unit is written in the IC memory during manufacturing.

According to another preferred embodiment, the external device is connectable to an interface terminal of the data recording device, which is exposed to outside of the unit body.

Alternatively, an IC memory is incorporated into a cartridge shell, whereas a data recording circuit is mounted on a flash circuit board. The IC memory and the data recording circuit are connected through an interconnection device which is mounted to a cartridge chamber. After the cartridge shell containing a full length of the exposed photo filmstrip therein is removed from the unit body, an external device reads data from the IC memory of the cartridge shell to record the data on the magnetic recording layer of the photo filmstrip withdrawn from the cartridge shell.

It is preferable to write data specific to a photo film unit in the IC memory of the cartridge shell, before loading the cartridge shell and the photo filmstrip in the photo film unit.

A lens-fitted photo film capable of writing data in an IC memory and easy to assemble comprises:

an IC memory incorporated into the cartridge shell;

an interconnection device mounted to the cartridge chamber, the interconnection device being connected to the IC memory of the cartridge shell contained in the cartridge chamber, and having an external terminal exposed to an exterior of the cartridge chamber;

a flash circuit board having a flash circuit of a built-in flash device mounted thereon, the flash circuit board being attached to a front of the film roll chamber;

a data recording circuit mounted on the flash circuit board, for recording data in the IC memory, the data recording circuit having an extension extending from the flash circuit board toward the cartridge chamber, a data output terminal being disposed on a tip of the extension for outputting the data to the external terminal of the interconnection device through a contact connection or a non-contact connection.

According to a preferred embodiment, the extension is formed integrally with the flash circuit board, and the interconnection device comprises a printed circuit board attached to the cartridge chamber in a removable fashion. A plurality of metal contact pins are mounted to the printed circuit board, and protrude into the cartridge chamber to contact a contact member of the cartridge shell for connection to the IC memory. The external terminal is formed integrally with the printed circuit board, and is disposed so as to be connected to the data output terminal only by attaching the flash circuit board to the front of the film roll chamber.

BRIEF DESCRIPTION OF THE DRAWINGS

The objects and advantages of the present invention will become more apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
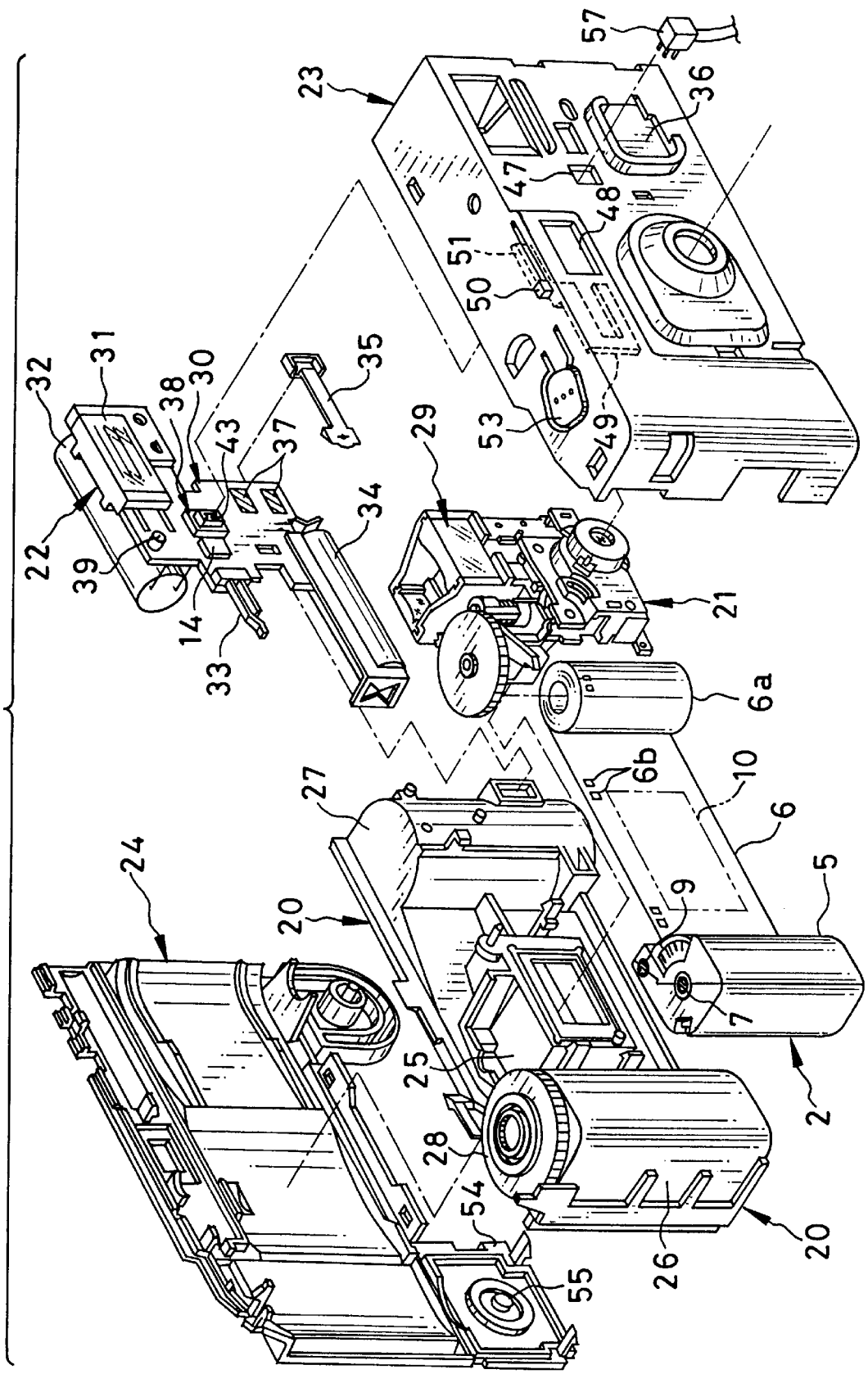
FIG. 1 is an exploded perspective view of a film unit having an IC memory, according to an embodiment of the present invention.
Figure 2:
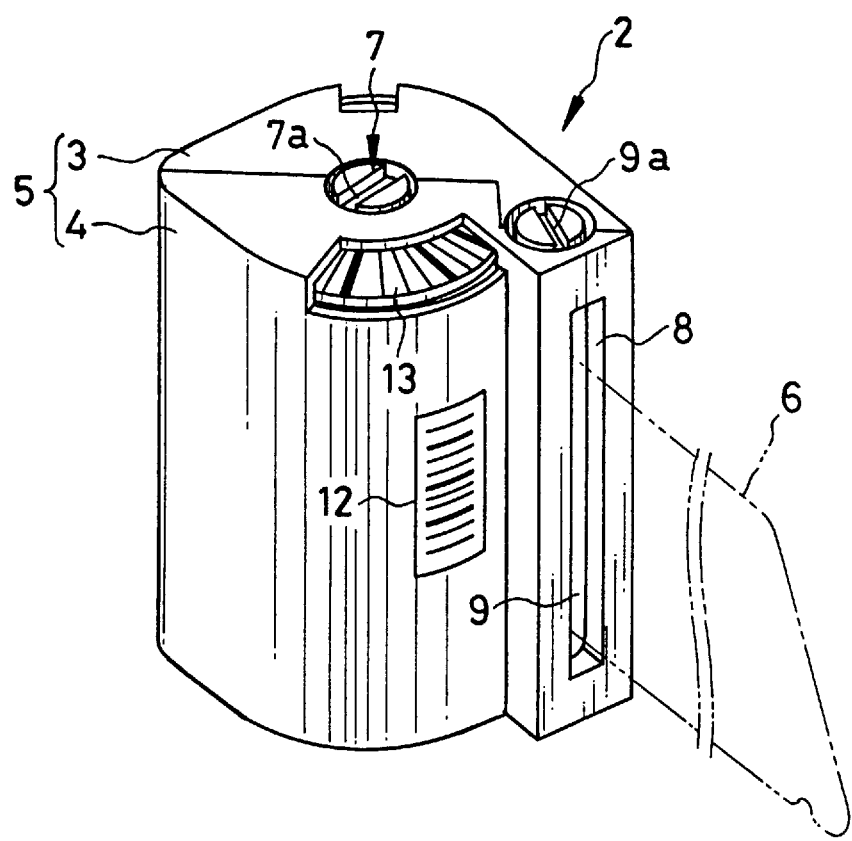
FIG. 2 is a perspective view of a photo film cartridge contained in the film unit of FIG. 1.

FIG. 1 shows a film unit according to an embodiment of the invention, which contains an IX 240 type photo film cartridge 2. As shown in FIG. 2, a cartridge shell 5 of the photo film cartridge 2 consists of a pair of plastic shell halves 3 and 4, and a roll of photo filmstrip 6 is coiled around a spool 7 which is rotatable in the cartridge shell 5. The photo film strip 6 can be advanced out of the cartridge shell 5 through a film port 8 in response to an unwinding rotation of the spool 7. A door member 9 is disposed behind the film port 8. The door member 9 is rotated to open the film port 8 when to pass the photo filmstrip 6 through the film port 8, or close the film port 8 in a light-tight fashion when to shield the interior of the cartridge shell 5 from ambient light. The spool 7 and the door member 9 have key grooves 7a and 9a which are exposed to the outside of the cartridge shell 5 at end faces thereof, so as to permit rotating the spool 7 and the door member 9 from outside. A film advancing mechanism of the IX 240 type photo film cartridge is disclosed in detail for example in U.S. Pat. No. 5,476,232.

The photo filmstrip 6 has a transparent magnetic recording layer on its back surface, which permits recording photographic data or photo-lab data necessary for printing. In the factory, an ID number is photographically recorded on one side of each photo filmstrip 6 in the form of a latent image of bar code. In addition to the latent image, it is possible to record the ID number and film type data on the magnetic recording layer in the factory. A bar code label 12 is put on the cartridge shell 5 to indicate the same ID number as the photo filmstrip 6 has, to correlate the cartridge shell 5 with the photo filmstrip 6. The photo film cartridge 2 also has a bar code disc 13 having bar code printed thereon to indicate the film type and the number of available exposures. The bar code disc 13 rotates with the spool 7.

A unit body 18 of the film unit is constituted of a body base portion 20, an exposure unit 21, a flash unit 22, a front cover 23, and a rear cover 24. The body base portion 20 has an exposure chamber 25, a cartridge chamber 26 and a film roll chamber 27 as an integral molded part. In a dark room of the factory, the photo filmstrip 6 is withdrawn from the cartridge shell 5, and is loaded in the film roll chamber 27 in form of a roll 6a, while the cartridge shell 5 is loaded in the cartridge chamber 26.

Figure 3:
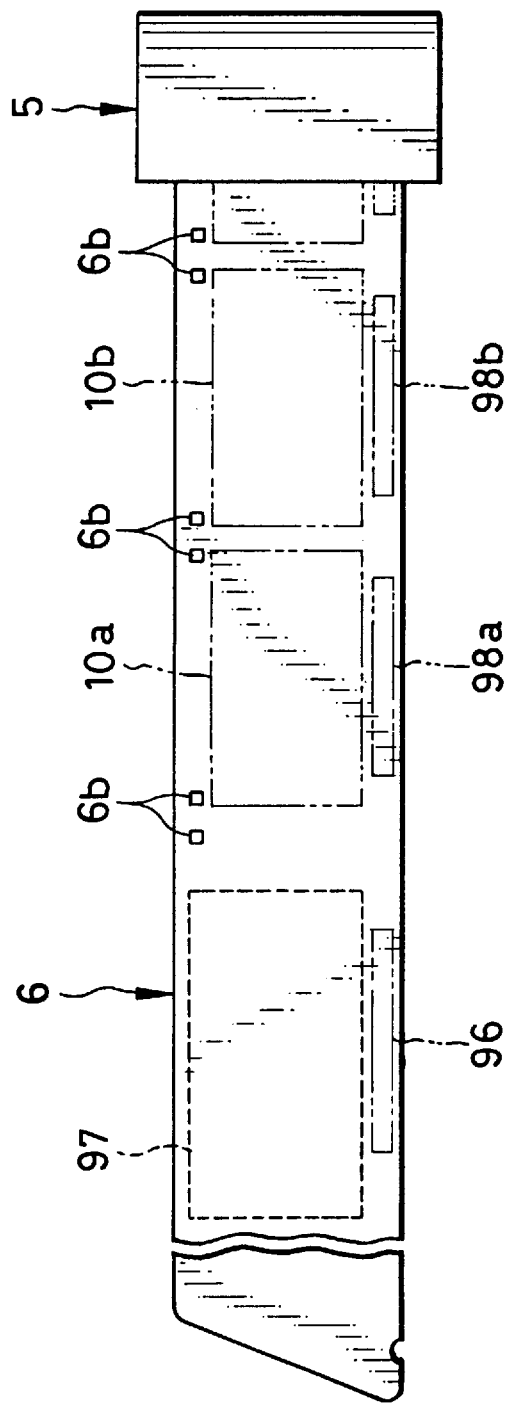
FIG. 3 is an explanatory view of the photo filmstrip of the film cartridge of FIG. 2.

The exposure unit 21 is an assembly having a taking lens, a shutter mechanism, a film advancing mechanism, a frame counter mechanism and a viewfinder optical system 29. A film advancing wheel 28 is mounted atop of the cartridge chamber 26 such that an axle of the film advancing wheel 28 engages the key groove 7a of the spool 7 of the cartridge shell 5. The film advancing wheel 28 is rotatable in a counterclockwise direction in the drawing, to rotate the spool 7 to wind the photo filmstrip 6 into the cartridge shell 5. The photo filmstrip 6 is provided with a pair of perforations 6b per frame, each pair is spaced from another pair at a regular interval corresponding to one frame, as is shown in FIG. 3. A not-shown sprocket member of the film advancing mechanism is engaged in the pair of perforations 6b each time the photo filmstrip 6 is advanced by one frame, thereby locking the film advancing wheel 28. While the photo filmstrip 6 is advanced by one frame, the shutter mechanism is charged in cooperation with the film advancing mechanism. When the shutter mechanism is released to expose a frame 10 on the photo filmstrip 6, the film advancing wheel 28 is unlocked. Thus, the photo filmstrip 6 is wound into the cartridge shell 5 one frame after each exposure. The frames 10, 10a, 10b . . . are formed in the same size throughout the filmstrip 6.

Unlike a conventional 135-type photo film cartridge wherein the spool alone is required to be externally rotatable, the IX 240 type photo film cartridge 2 need to be loaded in a camera or the film unit such that the door member 9, as well as the spool 7, is externally rotatable. That is, the key groove 9a of the door member 9 must be engaged with a key member provided in the cartridge chamber 26, while the key groove 7a of the spool 7 must be engaged with the axle of the film advancing wheel 28. To facilitate positioning the photo film cartridge 2, the cartridge shell 5 is held at the ends of the spool 7 in the cartridge chamber 26 so as to be rotatable about the spool 7.

The flash unit 22 is constituted of a flash circuit board 30 and a flash emitting portion 31 attached to the flash circuit board 30. On the circuit board are mounted a main capacitor 32 for charging electric power for a flash, a synchronizing switch 33, and a AA type dry cell battery as a power source 34. When a charge switch 35 is pushed by an operation member 36 of the front cover 23 onto a switch pattern 37 formed on the flash circuit board 30, the main capacitor 32 starts being charged. The synchronizing switch 33 is turned on at the moment when the shutter mechanism is released. An output signal generated when the synchronizing switch 33 is turned on is used as a timing signal for flashing, and also as an exposure detection signal indicating that an exposure is done.

In addition to the above flash circuit, an IC memory 14, a recording control IC 38 and a reflective photo sensor 39 are mounted on the flash circuit board 30. As the IC memory 14, an EEPROM or flash memory is preferable because it does not need a power source for holding data. But another memory such as RAM may be used if it is possible to mount a back-up power source on or beneath the flash circuit board 30. The IC memory 14 and the recording control IC 38 may be formed as an integral circuit. The IC memory 14 can be a cheap one whose capacity is about 1 kbit to 2 kbit, but may have a larger capacity depending upon the needs and the cost.

In the factory, fundamental data including unit ID (identification) data and production date data is written in a predetermined address of the IC memory 14. A CPU, a program memory, a clock generator and a counter are integrated into the recording control IC 38. The counter starts counting clock pulses from the time when the power source battery 34 is connected to supply the recording control IC 38 through a booster circuit included in the flash circuit, that is, on the same date as indicated by the production date data written in the IC memory 14. The recording control IC 38 further receives the exposure detection signal from the synchronizing switch 33 at each exposure, and a flash on-off signal indicating whether a flash emission is executed or not. The photo sensor 39 has a light emitting member and a light receiving member, and is adapted to output a print format signal in cooperation with a finder mask 49, as will be described in detail later. The print format signal is also sent to the recording control IC 38.

A connector 43 is provided on the front of the recording control IC 38. The connector 43 operates as an interface which allows external devices to write additional data such as print order date data and photo-lab ID code data in the IC memory 14, and read photographic data from the IC memory 14. The photographic data read from the IC memory 14 can be written on the magnetic recording layer of the photo filmstrip 6, as will be described in detail later.

The front cover 23 is attached to the front of the body base portion 20. The front cover 23 has several openings in its front, including an opening 47 for exposing the connector 43 of the recording control IC 38 to the outside, and an objective window 48 of the viewfinder, in addition to those for exposing the taking lens and the flash emitting portion 31 to the outside. The objective window 48 has an aspect ratio of 9:16 which is equal to that of the wide screen of the Hi-vision TV. Also the frame 10 on the photo filmstrip 6 is determined to have the same aspect ratio. Thus, this aspect ratio 9:16 is referred to as the standard aspect ratio, and the field of view of the viewfinder defined by the objective window 48 will be referred to as a standard size.

The finder mask 49 is mounted behind the objective window 48 so as to be slidable on the front cover 23 by operating a knob 50. In a standard position, the finder mask 49 is located out of the objective window 48, to provide the standard size view field. A signal plate 51 is formed integrally with the finder mask 49, and has a mirror surface on the rear side. When the finder mask 49 is inserted in the objective window 48, the field of view is limited to a panoramic size having an aspect ratio of about 1:2.8. Simultaneously, the signal plate 51 is moved in front of the photo sensor 39. The recording control IC 38 checks the output level of the photo sensor 39 upon each exposure detection signal from the synchronizing switch 33. When the high-reflective signal plate 51 is opposed, the output level of the photo sensor 39 changes remarkably compared with the case where the signal plate 51 is out of the front of the photo sensor 39. Therefore, the output level of the photo sensor indicates which position the finder mask 49 is located at the exposure. Thus, the field size selected at each exposure is detected by the photo sensor 39, and is written as print format data in the IC memory 14 through the recording control IC 38.

In response to the output signal from the synchronizing switch 33, the recording control IC 38 further determines whether the flash is effected or not, for example, by checking whether the main capacitor 32 is discharged or not. The recording control IC 38 writes the result of determination as flash data for each frame in the IC memory 14. In addition, the number of clock pulses counted by the counter is recorded for each frame in the IC memory 14.

A shutter button 53 is formed integrally with a top wall of the front cover 23, so as to be resiliently depressed to release the shutter mechanism. The rear cover 24 covers the rear and bottom of the body base portion 20 in a light-tight fashion. A bottom lid 54 for closing an open bottom of the cartridge chamber 26 has a boss 55 to support the lower end of the spool 7 such that the cartridge shell 5 is rotatable about the spool 7 in the cartridge chamber 26.

The unit body 18 is wrapped with a not-shown cardboard outer casing having openings for exposing necessary elements of the unit body 18, such as the taking lens and the shutter button 53, to the outside. The opening 47 for the connector 43 is covered with the outer casing. The photographer is expected to use the film unit as wrapped with the outer casing. As set forth above, each time the shutter button 53 is depressed to make an exposure, the print format data, the flash data and the clock pulse count data are written in the IC memory 14.

Figure 4:
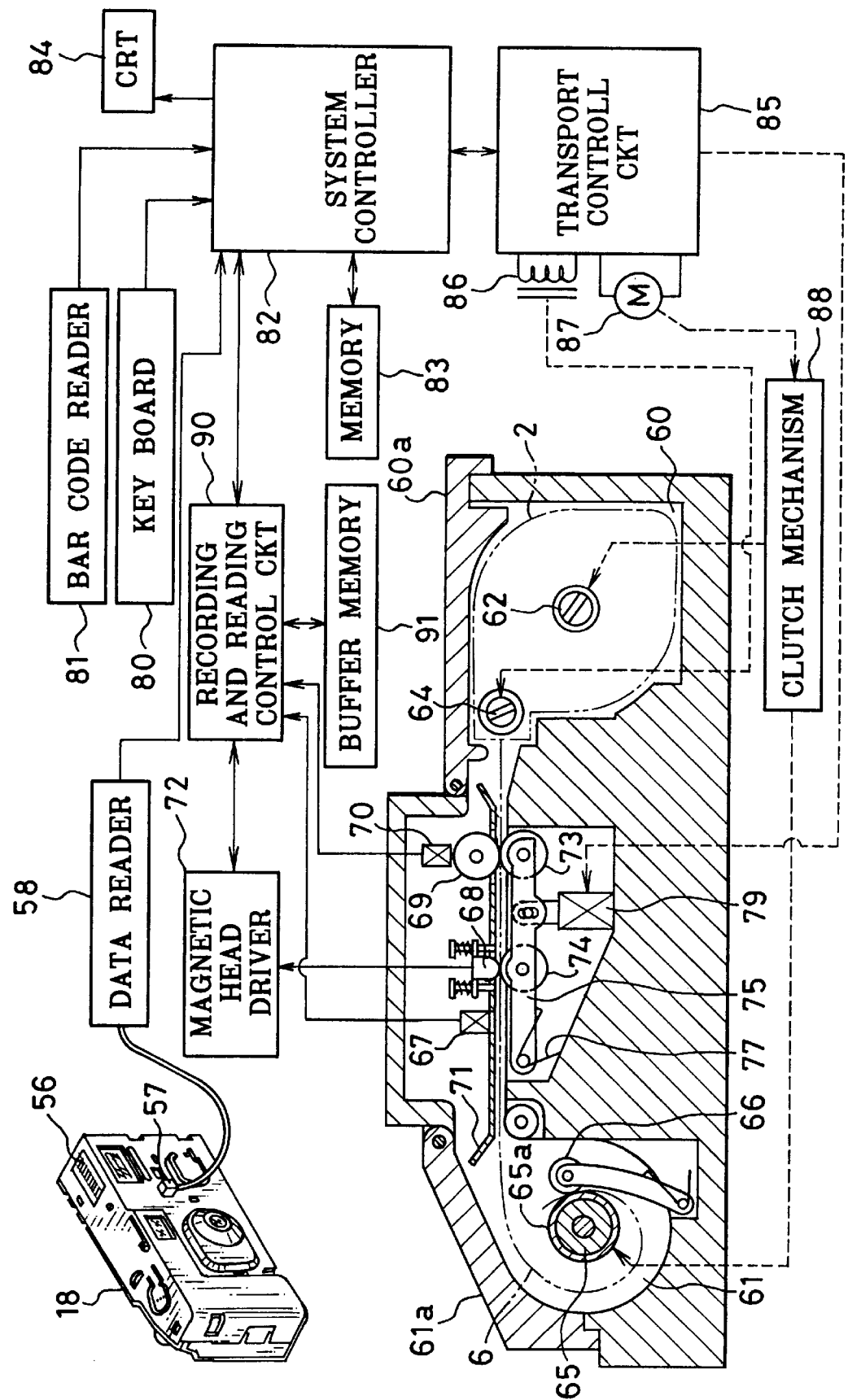
FIG. 4 is a schematic diagram of a magnetic data recording device for use with the film unit of FIG. 1.

After the available number of frames are photographed in the film unit, the film unit is forwarded to a retail photo-shop or agency, wherein the outer casing is removed from the unit body 18, and a bar code label 56 is put on the unit body 18, as shown in FIG. 4. The bar code label 56 has a bar code indicating an ID number of the photo-shop and an order reception number, to allow the photo-lab to identify the individual film unit and the photo-shop in charge of that film unit.

In the photo-lab, the photo film cartridge 2 containing the exposed photo film 6 is removed from each of the film units which are collected from the agencies. Before the removal, the film advancing wheel 28 is rotated to wind the photo film 6 completely into the cartridge shell 5, for insurance, and then the door member 9 is closed by use of a specific tool. For efficiency sake, it is possible to provide the film unit with a mechanism which interconnects between the door member 9 and the bottom lid 54 such that the door member 9 is automatically closed in response to the bottom lid 9 being opened.

As shown in FIG. 4, the unit body 18 and the photo film cartridge 2 removed from the unit body 18 are set in a magnetic recording device for reading the IC memory 14 of the unit body 18 and recording the photographic data stored in the IC memory 14 on the magnetic recording layer on the photo filmstrip 6. For the magnetic data recording, it is preferable to use the same binary data recording format as used for magnetic data recording in IX 240 type cameras which are adapted to the IX 240 type photo film cartridge. The binary data recording format is disclosed, for example, in JPA 7-219021.

The magnetic data recording device has a plug 57 which is connectable to the connector 43 of the unit body 18 through the opening 47, and is connected to a data reader 58 built in the magnetic data recording device. The magnetic data recording device is provided with a cartridge chamber 60 and a film take-up chamber 61 which can be closed by lids 60a and 61a in a light-tight fashion. A not-shown safety switch is provided to check the positions of the lids 60a and 61a, and inhibit the magnetic recording device from actuation unless the lids 60a and 61a both are completely closed.

A spool drive shaft 62 is disposed in the cartridge chamber 60, so as to be engageable with the key groove 7a of the spool 7 when the photo film cartridge 2 is placed in the cartridge chamber 60. In proximity to an exit of the cartridge chamber 60, a door drive shaft 64 is disposed to engage the key groove 9a of the door member, to open and close the door member 9. The film take-up chamber 61 has a take-up spool 65 coated with rubber 65a for friction, and a press roller 66. The inner walls of the film take-up chamber 61 and the lid 61a form a smooth semi-cylindrical guide surface to guide the leading end of the photo film 6 to the take-up spool 65. A guide plate 71 is disposed above a film passageway between the cartridge chamber 60 and the film take-up chamber 61. A reflective photo sensor or perforation sensor 67 for detecting the perforations 6b, a magnetic head 68 and an encode roller 69 are mounted on the guide plate 71 to face the photo film 6 through openings of the guide plate 71.

The magnetic head 68 makes magnetic recording on the magnetic recording layer on the photo film 6 in response to recording signals from a magnetic head driver 72. The encode roller 69 cooperates with a nip roller 73 to nip the photo filmstrip 6 and rotate along with the photo filmstrip 6 being transported from the cartridge chamber 60 to the film take-up chamber 61. The encode roller 69 has black-and-white axial stripes at regular intervals around its periphery, and a reflective photo sensor 70 detects the stripes as a reference to the film transporting speed.

A lever member 75 is disposed below the film passageway, to support the nip roller 73 and a press roller 74 for pressing the photo filmstrip 6 onto the magnetic head 68. The lever 75 is urged by a spring 77 toward a nip position shown in FIG. 4, so long as a solenoid 79 is turned on. When the solenoid 79 is turned off, the lever member 75 is locked in a retracted position wherein the nip roller 73 and the press roller 74 are set away from the photo filmstrip 6.

When recording photographic data stored in the IC memory 14 of the unit body 18 on the magnetic recording layer of the photo filmstrip 6, the photo film cartridge 2 is placed in the cartridge chamber 60 of the magnetic recording device, and the plug 57 is connected to the connector 43 of the unit body 18. Then, the operator actuates the magnetic recording device through a key board 80. First, the bar code on the bar code label 56 of the unit body 56 is decoded to enter the photo-shop ID number and the order reception number in a system controller 82 of the magnetic recording device. The system controller 82 writes the decoded data in a memory 83, and displays the decoded data on a CRT 84.

Responsive to a data transfer command through the key board 80, the system controller 82 sends a start signal to a transport control circuit 85. The transport control circuit 85 first actuates a rotary solenoid 86 to rotate the door drive shaft 64 in a direction to open the door member 9. When it is determined that the rotary solenoid 86 is properly actuated, the system controller 82 reads the data stored in the IC memory 14 through the data reader 58, including the fundamental data written in the factory, including the unit ID data and the date-of-manufacture data, and the photographic data recorded for each fame during the photography, including the flash data, the print format data and the clock pulse number data.

The system controller 82 stores the data read from the IC memory 14 in predetermined locations in the memory 83, and derive date-of-photograph data of each frame from the production date data and the clock pulse number data. The date-of-photograph data is also stored for each frame in the memory 83. The system controller 82 checks the data format of the data read from the IC memory 14, and sends a transport command to the transport control circuit 85. Then, the transport control circuit 85 drives a transport motor 87 in a forward direction to rotate the spool drive shaft 62 and the take-up spool 65 counterclockwise through a clutch mechanism 88. The clutch mechanism 88 is adapted to make the rotational speed of the take-up spool 65 faster than that of the spool drive shaft 62.

The counterclockwise rotation of the spool drive shaft 62 and thus the spool 7 advances the leader of the photo filmstrip 6 out of the cartridge shell 5 into the film passageway of the magnetic recording device. In this stage, the nip roller 73 and the press roller 74 are retracted from the film passageway, so that the leader of the photo filmstrip can smoothly be moved toward the film take-up chamber 61. After the leader reaches the film take-up chamber 61, the leader is guided along the semi-cylindrical guide surface and an arm supporting the press roller 66, into between the rubber coated periphery 65a of the take-up spool 65 and the press roller 66. Thereafter, the photo filmstrip 6 is coiled around the take-up spool 65 with the rotation of the take-up spool 65.

Since the photo filmstrip 6 begins to be wound up by the rotation of the take-up spool 65, the spool drive shaft 62 begins to rotate by the movement of the photo filmstrip 6 at a speed higher than the original speed. Then, the clutch 88 operates to disconnect the spool drive shaft 62 from the motor 87, so that the spool drive shaft 62 is rotated only by the movement of the photo filmstrip 6, that is, by the rotation of the film take-up spool 65. When the photo filmstrip 6 is securely wound around the film take-up spool 65, e.g., when the clutch mechanism 88 is switched over, the solenoid 79 is driven to unlock the lever 75. Then, the lever 75 swings in the counterclockwise direction under the urging power of the spring 77, to place the nip roller 73 and the pressing roller 74 into the film passageway, thereby to press the photo filmstrip 6 onto the encode roller 69 and the magnetic head 68, respectively. Then, the encode roller 69 starts rotating at a peripheral speed corresponding to the film transport speed.

Responsive to a drive signal of the solenoid 79, the system controller 82 reads out the data from the memory 83, and transfer it to a buffer memory 91 through a recording and reading control circuit 90. In this stage, the exposed frames are still in the cartridge shell 5, because there is a non-recording area in the leader of the photo filmstrip 6, that is longer than the conventional 135-type photo filmstrip. The film transport speed is monitored by the photo sensor 70 as the rotational speed of the encode roller 69. The recording and reading control circuit 90 reads the data from the buffer memory 91, and drives the magnetic head driver 72 at the timing determined based on the film transport speed and an output from the perforation sensor 67, to record the data on the magnetic recording layer of the photo filmstrip 6.

Specifically, when the film transport speed reaches in a given stable range corresponding to the rotational speed of the take-up spool 65, the recording and reading control circuit 90 sends a recording signal that corresponds to the photo-shop ID code and the order reception number from the buffer memory 91 to the magnetic head driver 72. Then, the magnetic head 68 is driven to record the photo-shop ID code data and the order reception number data on a leading track 96 along a leading edge before a leading frame 10a nearest to the leading end of the photo filmstrip 6, as shown in FIG. 3. It is to be noted that the leading frame 10a is the frame that was exposed at last in the film unit. It is possible to record the photo-shop ID code data and the order reception data on anywhere in the non-recording area 97 before the first frame 10a. However, because the magnetic head can scratch the back surface of the photo filmstrip 6, it is preferable to record data on the edge of the photo filmstrip 6 outside the frames.

Thereafter while the photo filmstrip 6 is further transported, the perforation sensor 67 detects the first pair of perforations 6b nearest to the film leader. Then, the recording and reading control circuit 90 reads out the flash data, the print format data and the date-of-photograph data of the last exposed frame, and also the unit ID data from the buffer memory 91, and sends a recording signal corresponding to these data to the magnetic head driver 72. As a result, the magnetic head 68 records the photographic data of the last exposed frame 10a on a magnetic recording track 98a extending along the last exposed frame 10a. Since the photo sensor 70 continues to monitor the film transport speed, the data can be recorded at a proper timing in a proper format. In the same way, when the second pair of perforations 6b are detected by the perforation sensor 67, the recording and reading control circuit 90 reads out the photographic data of the frame 10b exposed second from the last, and the unit ID data from the buffer memory 91. The photographic data is recorded on a magnetic recording track 98b extending along the frame 10b.

In this way, the photographic data of each frame is read to be recorded on the magnetic recording track allocated to each frame in the reversed order to the photography in the film unit. As for the frame nearest to the trailing end of the photo filmstrip 6 that is secured to the spool 7, it is convenient for photo-printing to record code data to indicate that this is the trailing frame of one filmstrip, in addition to the photographic data of the first exposed frame. This code data may be recorded on a trailing portion behind the first exposed or trailing frame.

After the photographic data is recorded in this way to the trailing end of the photo filmstrip 6, the system controller 82 outputs a rewinding command to the transport control circuit 85. Then the transport motor 87 starts being rotated in a reverse direction to rotate the spool drive shaft 62 in a direction to rewind the photo filmstrip 6 in the cartridge shell 5. In this stage, the clutch mechanism 88 disconnects the take-up spool 65 from the transport motor 87, so that the take-up spool 65 rotates along with the rewinding movement of the photo filmstrip 6. During rewinding, the system controller 82 operates the recording and reading control circuit 90 in a reproduction mode. The magnetic head 68 reads the data recorded on the magnetic recording tracks, and the data read is sent through the head driver 72 to the recording and reading control circuit 90. The recording and reading control circuit 90 collates the reproduced data with the data stored in the buffer memory 91 with reference to the output from the perforation sensor 67. Of course, the direction of data reading is reverse to the data recording direction, so that the data in the buffer memory 91 is read in the reversed order for collation.

If all the data is identical, the transport motor 87 stops in a given delay time after the take-up spool 65 stops rotating, when the film leader has been rewound into the cartridge shell 5. Thereafter, the rotary solenoid 86 rotates the door drive shaft 64 in a direction to close the door member 9, and the solenoid 79 is turned off to retract the lever 75 away from the film passageway. If there is any difference between the recorded data and the stored data, correct data is overwritten on the corresponding magnetic recording track. If necessary, all the magnetic recording tracks are rewritten.

The photo film cartridge 2 having the data magnetically recorded on the photo filmstrip 6 is subjected to the development and printing. Even though the photo filmstrip 6 is separated from the cartridge shell 5 during the development, since the latent image of the ID number bar code formed on the photo filmstrip 6 is developed concurrently with the photographic images, it is possible to correlate the photo filmstrip 6 to the cartridge shell 5 with reference to the ID number indicated by the bar code label 12.

After the data is completely transferred from the IC memory 14 to the magnetic recording tracks on the photo filmstrip 6, the unit body 18 is subjected to a recycling process. First, all the data is erased from the IC memory 14, and the flash circuit board 30 with the IC memory 14 is inspected. If all the elements on the flash circuit board 30 operate normally, the flash circuit board 30 is reused. If any element on the flash circuit board 30 except the IC memory 14 is defective, only the IC memory 14 is reused on a new flash circuit board 30.

The developed frames on the photo filmstrip 6 are seriatim subjected to printing in the order from the leading end. The printer reads the photographic data from the magnetic recording track 98a, 98b of each frame, to utilize for controlling exposure for each frame. For example, if the printer recognizes the unit ID data, a wider exposure correction range is selected for that photo filmstrip 6. If it is indicated by the flash data that the frame is formed by flash photography, the printer may correct the exposure so that a central area of the photo-print has a proper exposure condition, assuming that the main subject is mostly located in the central area. In this way, the printer can make adequate prints while taking photographic properties of the film unit into consideration.

If the print format data designates the panoramic size, the print magnification and the paper mask size are automatically adapted to the panoramic size. Since it is unnecessary to mount any frame mask device in the film unit for designating a print format to each frame, the system of the present embodiment contributes to the cost saving of the film unit. It is also possible to marge-print the date of photography at an appropriate position and in either direction of the photo-print, in an appropriate color and size. The photo-lab data read from the leading magnetic track 96 may be printed on the back of the photo-print, so as to utilize it for managing delivery of the photo-prints from the photo-lab to the photo-shop. Moreover, it is possible to record the print format and the date of photography in association with each image on an index print that contains printed images of all frames recorded on the individual photo filmstrip. It is preferable to magnetically record exposure correction data or other kinds of print data on the opposite side of each frame from the magnetic recording track 98a or 98b having the photographic data, so that the print data may be utilized for extra-printing.

Figure 5:
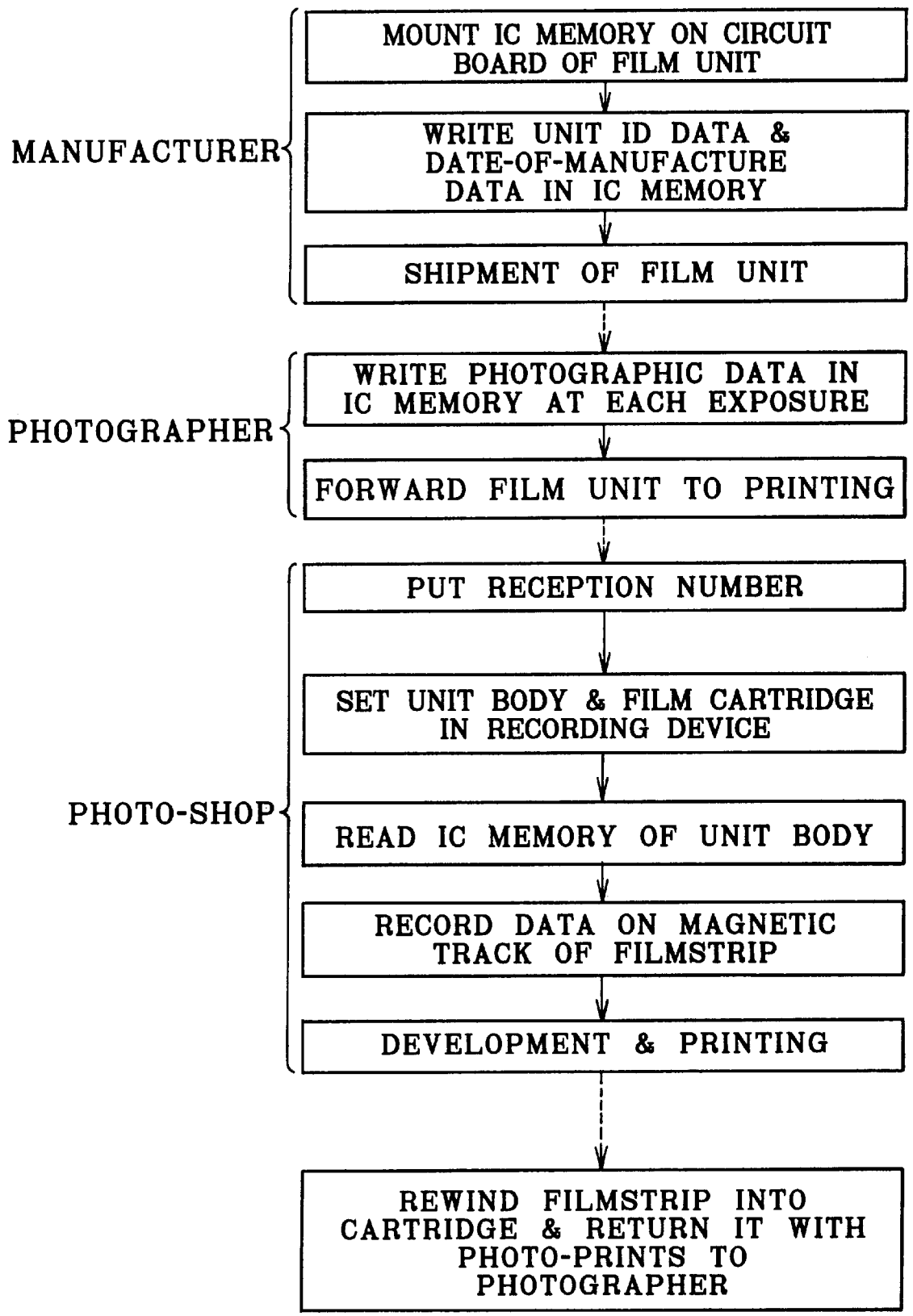
FIG. 5 is a flow chart illustrating the sequence of a photo printing system for the film unit of FIG. 1, using the magnetic data recording device of FIG. 3.

After the photographic processing in the photo-lab is accomplished, the developed photo filmstrip 6 is rewound back into the original cartridge shell 5, and is returned to the photographer through the photo-shop, together with the photo-prints made from the photo filmstrip 6. FIG. 5 shows the sequence of the photographic system for the film unit as described so far. Alternatively, it is possible to make the magnetic recording of the data written in the IC memory 14 after the photo filmstrip 6 is developed. In that case, it is unnecessary to shield the interior of the magnetic recording device shown in FIG. 4 from ambient light. Thus, the magnetic recording device may have a simple construction. As the data transfer operation in the magnetic recording device shown in FIG. 4 requires no skill, it is possible to install the magnetic recording device in the photo-shop to make the data transfer before forwarding the exposed photo film cartridge 2 to the photo-lab.

The position of the IC memory 14 is not to be limited to the front surface of the flash circuit board 30, but the IC memory 14 may be mounted on another position, e.g., the front or the side of the front cover 23. The IC memory 14 may be integrated in the recording control IC 38. The IC memory 14 and the recording control IC 38 may be cemented to the flash circuit board 30 or may be attached to the flash circuit board 30 in a removable fashion. In that case, it is possible to make the data transfer from the IC memory to the magnetic recording layer on the photo filmstrip after the IC memory is removed from the unit body. Therefore, the unit body can be directly forwarded to the recycling process.

The interface connector 43 may be replaced by a printed contact. The connector 43 may be exposed to the outside of the cardboard outer casing, so that the data reading and recording can be carried out without the need for removal of the outer casing. On the contrary, it is possible to cover the connector 43 with the front cover 23, so that the user may not access the IC memory 14. In that case, the data transfer from the IC memory 14 should be carried out after the flash circuit board 30 or at least the front cover 23 is detached from the body base portion 20.

It is possible to record data on the magnetic recording layer while the photo filmstrip 6 coiled around the take-up spool 65 of the magnetic recording device is rewound back into the cartridge shell 5. In that case, it is desirable to provide a magnetic reading head in addition to a magnetic writing head, so as to check if the data is correctly recorded.

Figure 6:
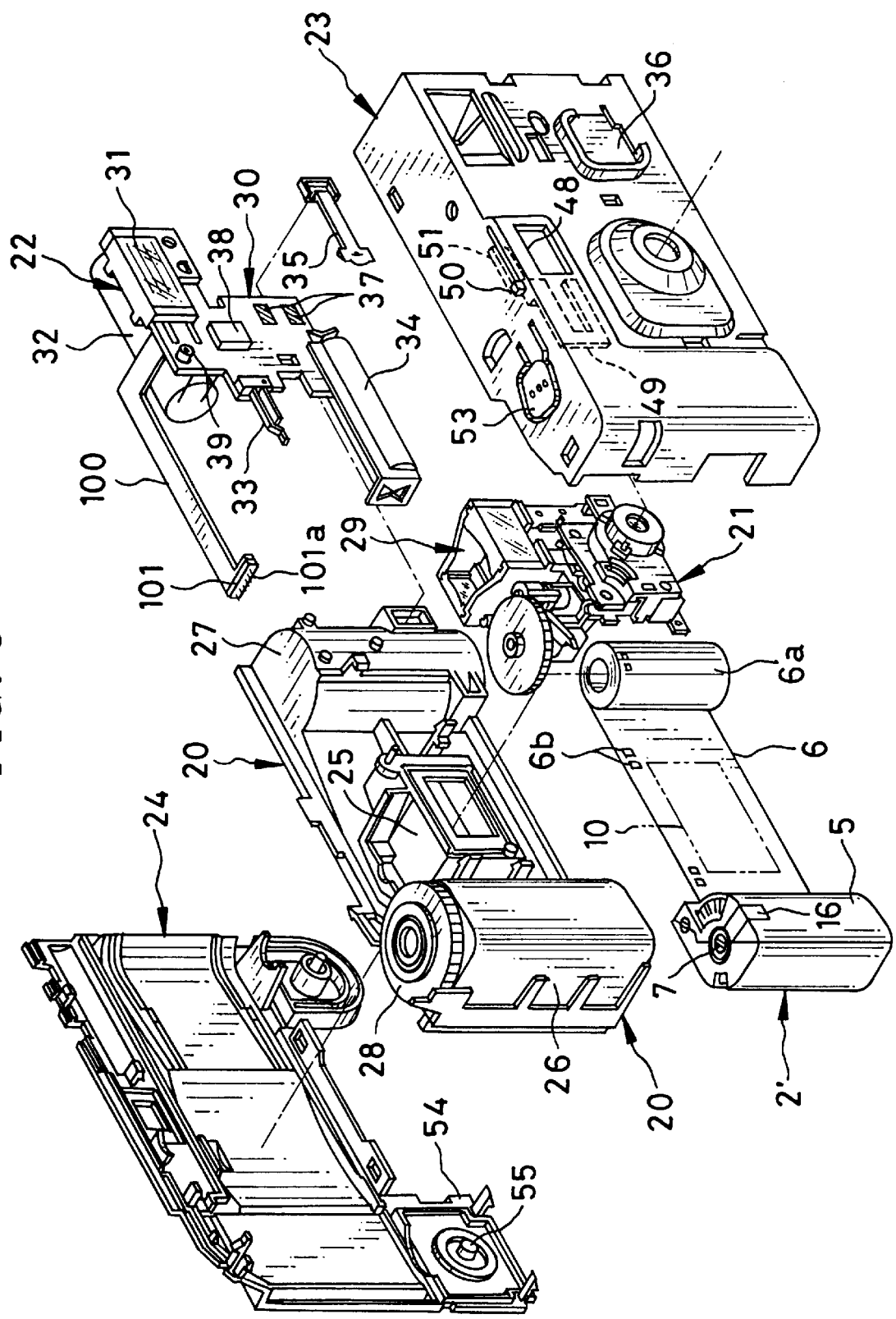
FIG. 6 is an exploded perspective view of a film unit according to a second embodiment of the present invention.
Figure 7:
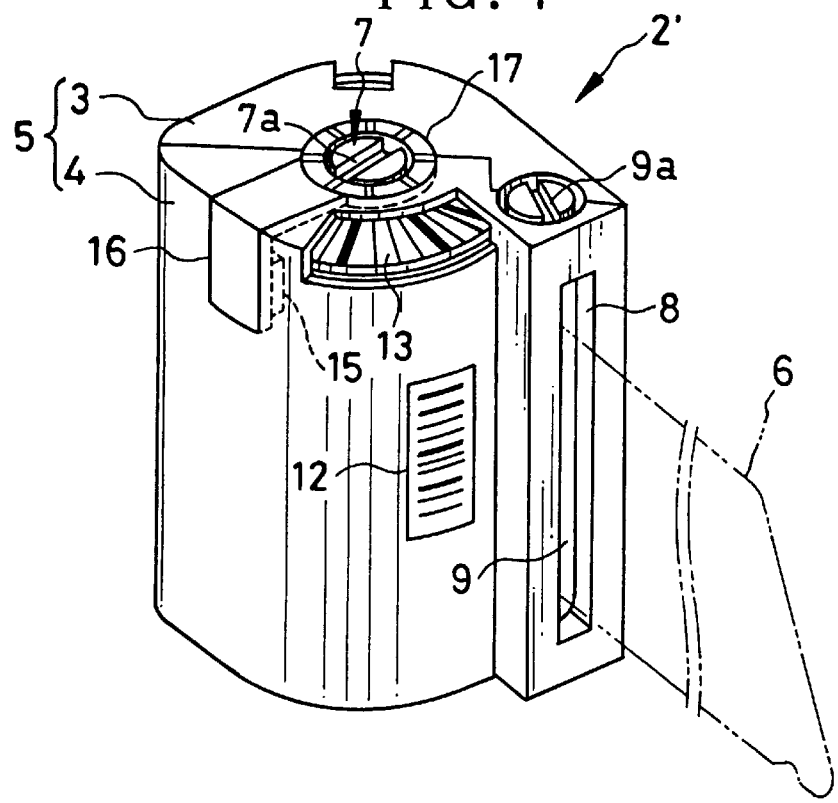
FIG. 7 is a perspective view of a photo film cartridge having an IC memory, for use in the film unit of FIG. 6.

FIG. 6 shows a film unit according to a second embodiment of the invention, which contains an IX 240 type photo film cartridge 2'. As shown in FIG. 7, the fundamental components of the photo film cartridge 2' are equivalent to those shown in FIG. 2, as designated by the same reference numbers. A photo film strip 6 can be advanced out of a cartridge shell 5 through a film port 8 in response to an unwinding rotation of a spool 7. A door member 9 is disposed behind the film port 8. The door member 9 is rotated to open the film port 8 when to pass the photo filmstrip 6 through the film port 8, or close the film port 8 in a light-tight fashion when to shield the interior of the cartridge shell 5 from ambient light. The spool 7 and the door member 9 have key grooves 7a and 9a which are exposed to the outside of the cartridge shell 5 at end faces thereof, so as to permit rotating the spool 7 and the door member 9 from outside.

The photo filmstrip 6 has a transparent magnetic recording layer on its back surface, which permits recording photographic data or photo-lab data necessary for printing. In the factory, an ID number is photographically recorded on one side edge of each photo filmstrip 6 in the form of a latent image of bar code. In addition to the latent image, it is possible to record the ID number and film type data on the magnetic recording layer in the factory. A bar code label 12 is put on the cartridge shell 5 to indicate the same ID number as the photo filmstrip 6 has, to correlate the cartridge shell 5 with the photo filmstrip 6. The photo film cartridge 2' also has a bar code disc 13 having bar code printed thereon to indicate the film type and the number of available exposures. The bar code disc 13 rotates with the spool 7.

A memory circuit board 16 is incorporated into the cartridge shell 5 of the photo film cartridge 2'. The memory circuit board 16 has an IC memory 15 and a contact pattern 17 which is disposed on the same end face of the cartridge shell 5 as the bar code disc 13. The contact pattern 17 consisting of a plurality of contact segments arranged radially around one end of the spool 7. The IC memory 15 is electrically connected to the contact pattern 17 through the memory circuit board 16 by the well-known wire bonding, and is united to the memory circuit board 16 by use of epoxy resin. As the IC memory 15, an EEPROM is preferable because it does not need a power source for holding data. But another memory such as RAM may be used if it is possible to mount a back-up power source on or beneath a flash circuit board 30. The IC memory 15 can be a cheap one whose capacity is about 1 kbit to 2 kbit, but may have a larger capacity depending upon the needs and the cost.

Because the photo film cartridge 2° is not limited to use in the film unit but may be loaded in a camera, fundamental data including unit ID (identification) data and production date data is written in a predetermined address of the IC memory 15 when the photo film cartridge 2' is determined to be used in the film unit. The unit ID data is to indicate the photo-lab or the printer that the photo film cartridge 2' is exposed in the film unit. The reproduction date data is utilized for printing the date of photography of each frame in the photo-lab.

As shown in FIG. 6, a unit body of the film unit is constituted of a body base portion 20, an exposure unit 21, a flash unit 22, a front cover 23, and a rear cover 24. The body base portion 20 has an exposure chamber 25, a cartridge chamber 26 and a film roll chamber 27 as an integral molded part. In a dark room of the factory, the photo filmstrip 6 is withdrawn from the cartridge shell 5, and is loaded in the film roll chamber 27 in form of a roll 6a, while the cartridge shell 5 is loaded in the cartridge chamber 26.

The exposure unit 21 is an assembly having a taking lens, a shutter mechanism, a film advancing mechanism, a frame counter mechanism and a viewfinder optical system 29. A film advancing wheel 28 is mounted atop of the cartridge chamber 26 such that an axle of the film advancing wheel 28 engages the key groove 7a of the spool 7 of the cartridge shell 5. The film advancing wheel 28 is rotatable in a counterclockwise direction in the drawing, to rotate the spool 7 to wind the photo filmstrip 6 into the cartridge shell 5. The photo filmstrip 6 is provided with a pair of perforations 6b per frame, each pair is spaced from another pair at a regular interval corresponding to one frame. A not-shown sprocket member of the film advancing mechanism is engaged in the pair of perforations 6b each time the photo filmstrip 6 is advanced by one frame, thereby locking the film advancing wheel 28. While the photo filmstrip 6 is advanced by one frame, the shutter mechanism is charged in cooperation with the film advancing mechanism. When the shutter mechanism is released to expose a frame 10 on the photo filmstrip 6, the film advancing wheel 28 is unlocked. Thus, the photo filmstrip 6 is wound into the cartridge shell 5 one frame after each exposure. The frames 10 are formed in the same size throughout the filmstrip 6.

The flash unit 22 is constituted of the flash circuit board 30 and a flash emitting portion 31 attached to the flash circuit board 30. On the circuit board are mounted a main capacitor 32 for charging electric power for a flash, a synchronizing switch 33, and a AA type dry cell battery 34. When a charge switch 35 is pushed by an operation member 36 of the front cover 23 onto a switch pattern 37 formed on the flash circuit board 30, the main capacitor 32 starts being charged. The synchronizing switch 33 is turned on at the moment when the shutter mechanism is released. An output signal generated when the synchronizing switch 33 is turned on is used as a timing signal for flashing, and also as an exposure detection signal indicating that an exposure is done.

In addition to the above flash circuit, a recording control IC 38, a reflective photo sensor 39 and a flexible connection plate 100 are mounted to the flash circuit board 30. A CPU, a program memory, a clock generator and a counter are integrated into the recording control IC 38. The counter starts counting clock pulses from the time when the power source battery 34 is connected to supply the recording control IC 38 through a booster circuit included in the flash circuit, that is, on the same date as indicated by the production date data written in the IC memory 15. The recording control IC 38 further receives the exposure detection signal from the synchronizing switch 33 at each exposure, and a flash on-off signal indicating whether a flash emission is executed or not. The photo sensor 39 has a light emitting member and a light receiving member, and is adapted to output a print format signal in cooperation with a finder mask 49, as will be described in detail later. The print format signal is also sent to the recording control IC 38.

Figure 8:
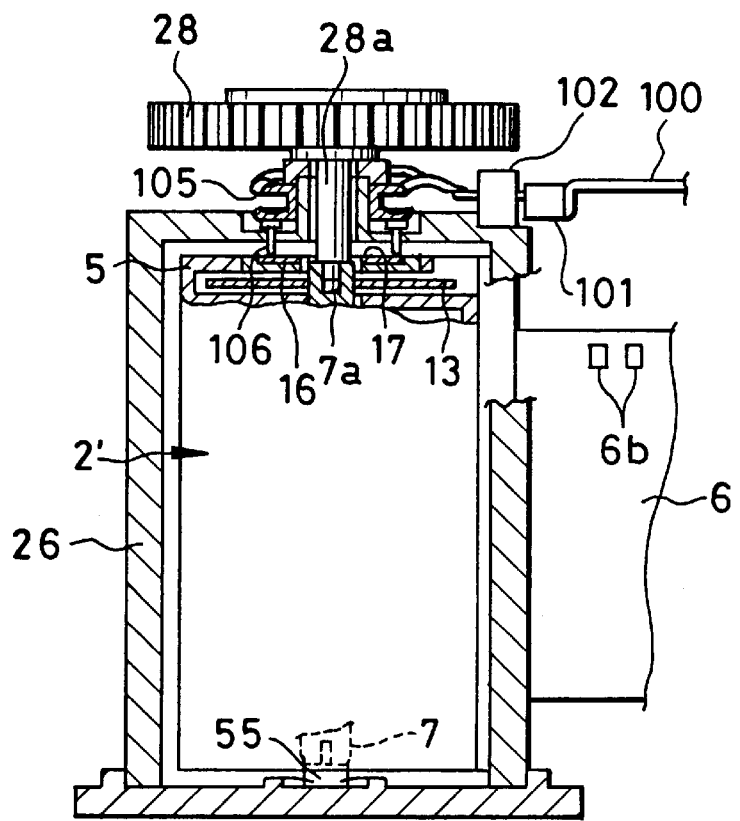
FIG. 8 is a fragmentary section of the film unit of FIG. 6, illustrating essential parts to this embodiment.

The flexible connecting plate 100 has a plug 101 at an end thereof. The plug 101 has an array of connector pins 101a, and is connected to a connector 102 which is mounted on the top of the cartridge chamber 26, as is shown in FIG. 8. The top wall of the cartridge chamber 26 is formed with a sleeve for bearing an axle 28a of the film advancing wheel 28, and a plurality of conductive metal contact segments 105 are disposed radially around the sleeve. Each contact segment 105 is resilient and is connected at its upper end to a pin of the connector 102 through soldering.

Connector pins 106 are disposed radially around the sleeve such that lower ends of the contact segments 105 individually press head portions of the connector pins 106, to urge the connector pins 106 to protrude into the cartridge chamber 26. When the cartridge shell 5 is positioned in the cartridge chamber 26, the connector pins 106 come into contact with the contact segments of the contact pattern 17 provided on the end face of the cartridge shell 5, that is oriented upward in the cartridge chamber 26. In this way, the IC memory 15 of the photo film cartridge 2' is connected to the recording control IC 38 of the unit body.

A bottom lid 54 for closing an open bottom of the cartridge chamber 26 has a boss 55 to support the lower end of the spool 7 such that the cartridge shell 5 is rotatable about the spool 7 in the cartridge chamber 26. Holding the cartridge shell 5 to be rotatable around the spool in the cartridge chamber 26 permits maintaining the contact pattern 17 in a proper position relative to the connector pins 106, as well as facilitates positioning the photo film cartridge 2' such that the key groove 9a of the door member 9 is engaged with a key member provided in the cartridge chamber 26, while the key groove 7a of the spool 7 is engaged with the axle 28a of the film advancing wheel 28.

The front cover 23 is attached to the front of the body base portion 20. The front cover 23 has several openings in its front, including an objective window 48 of the viewfinder, and those for exposing the taking lens and the flash emitting portion 31 to the outside. The objective window 48 has an aspect ratio of 9:16 which is equal to that of the wide screen of the Hi-vision TV. Also the frame 10 on the photo filmstrip 6 is determined to have the same aspect ratio. Thus, this aspect ratio 9:16 is referred to as the standard aspect ratio, and the field of view of the viewfinder defined by the objective window 48 will be referred to as a standard size.

The finder mask 49 is mounted behind the objective window 48 so as to be slidable on the front cover 23 by operating a knob 50. In a standard position, the finder mask 49 is located out of the objective window 48, to provide the standard size view field. A signal plate 51 is formed integrally with the finder mask 49, and has a mirror surface on the rear side. When the finder mask 49 is inserted in the objective window 48, the field of view is limited to a panoramic size having an aspect ratio of about 1:2.8. Simultaneously, the signal plate 51 is moved in front of the photo sensor 39. The recording control IC 38 checks the output level of the photo sensor 39 upon each exposure detection signal from the synchronizing switch 33. When the high-reflective signal plate 51 is opposed, the output level of the photo sensor 39 changes remarkably compared with the case where the signal plate 51 is out of the front of the photo sensor 39. Therefore, the output level of the photo sensor indicates which position the finder mask 49 is located at the exposure. Thus, the field size selected at each exposure is detected by the photo sensor 39, and is written as print format data in the IC memory 15 through the recording control IC 38, the plug 101 and the connector 102.

A shutter button 53 is formed integrally with a top wall of the front cover 23, so as to be resiliently depressed to release the shutter mechanism. The rear cover 24 covers the rear and bottom of the body base portion 20 in a light-tight fashion. In this way, each time the shutter button 53 is depressed to make an exposure, the print format data, the flash data and the clock pulse count data are written in the IC memory 15.

In response to the output signal from the synchronizing switch 33, the recording control IC 38 further determines whether the flash is effected or not, for example, by checking whether the main capacitor 32 is discharged or not. The recording control IC 38 writes the result of determination as flash data for each frame in the IC memory 15. In addition, the number of clock pulses counted by the counter is recorded for each frame in the IC memory 15.

After the available number of frames are photographed in the film unit, the film unit is forwarded to a retail photo-shop or agency, wherein a not-shown bar code label is put on the unit body. The bar code label has a bar code indicating an ID number of the photo-shop and an order reception number, which are referred to by the photo-lab during the photographic processing, and are utilized for delivery of the finished photo-prints and the developed photo filmstrip 6 to the user through the photo-shop.

In the photo-lab, the photo film cartridge 2' containing the exposed photo film 6 is removed from each of the film units which are collected from the agencies. Before the removal, the film advancing wheel 28 is rotated to wind the photo film 6 completely into the cartridge shell 5, for insurance, and then the door member 9 is closed by use of a specific tool. For efficiency sake, it is possible to provide the film unit with a mechanism which interconnects between the door member 9 and the bottom lid 54 such that the door member 9 is automatically closed in response to the bottom lid 9 being opened.

Figure 9:
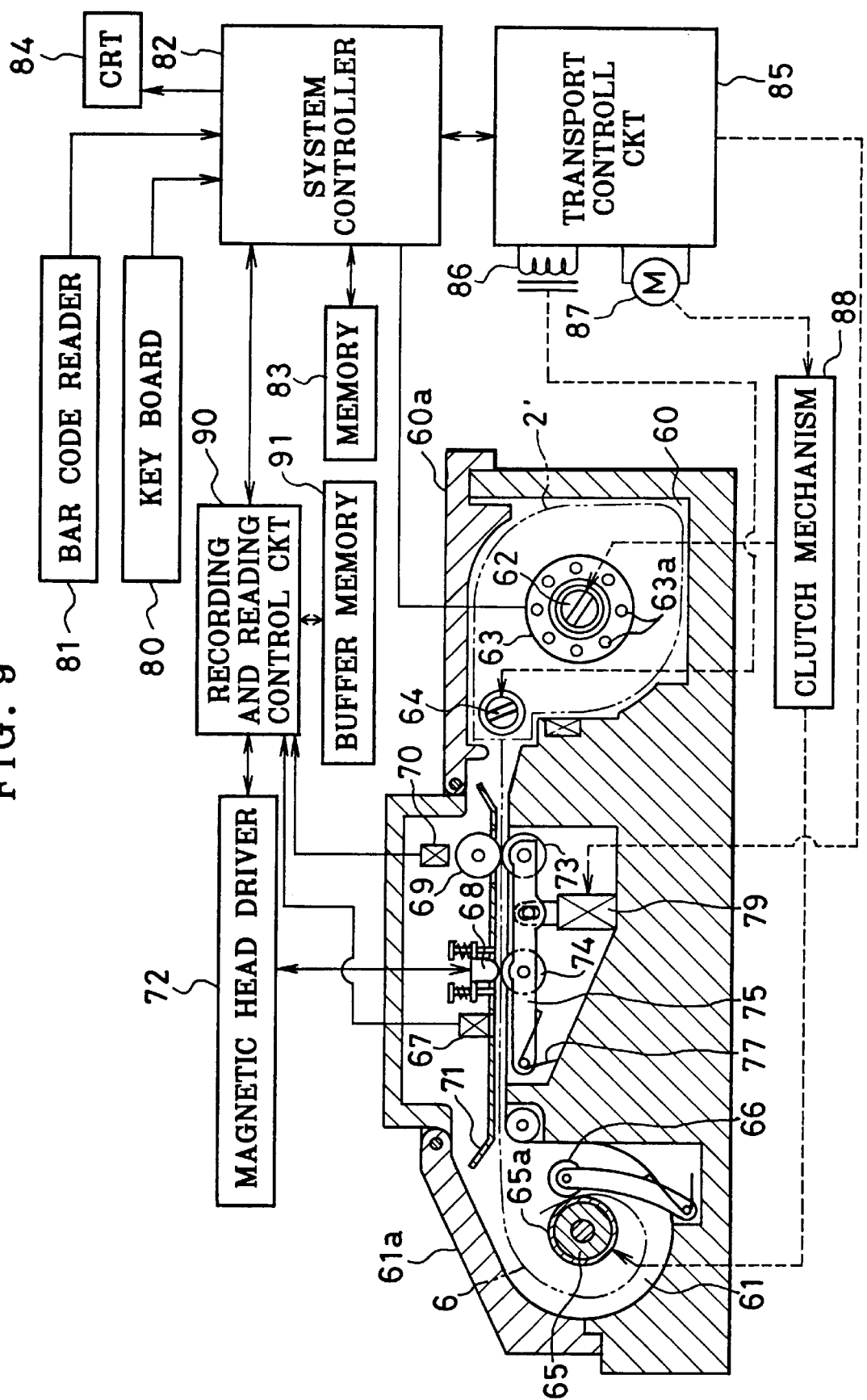
FIG. 9 is a schematic diagram of a magnetic data recording device for use with the film cartridge of FIG. 7.

As shown in FIG. 9, the photo film cartridge 2' removed from the unit body are set in a magnetic recording device for reading the IC memory 15 of the cartridge shell 5 and recording the photographic data stored in the IC memory 15 on the magnetic recording layer of the photo filmstrip 6. For the magnetic data recording, it is preferable to use the same binary data recording format as used for magnetic data recording in IX 240 type cameras which are adapted to the IX 240 type photo film cartridge. The binary data recording format is disclosed, for example, in JPA 7-219021.

The magnetic recording device is provided with a cartridge chamber 60 and a film take-up chamber 61 which can be closed by lids 60a and 61a in a light-tight fashion. A not-shown safety switch is provided to check the positions of the lids 60a and 61a, and inhibit the magnetic recording device from actuation unless the lids 60a and 61a both are completely closed.

A spool drive shaft 62 is disposed in the cartridge chamber 60, so as to be engageable with the key groove 7a of the spool 7 when the photo film cartridge 2' is placed in the cartridge chamber 60. A data reader 63 is disposed around the spool drive shaft 62, and connector pins 63a of the data reader 63 are urged by a spring force to protrude axially into the cartridge chamber 60, like the above connector pins 106 disposed in the top wall of the cartridge chamber 26 of the film unit. The connector pins 63a are connected to the contact pattern 17 of the memory circuit board 16 of the cartridge shell 5 when the photo film cartridge 2' is positioned in the cartridge chamber 60 of the magnetic recording device. In proximity to an exit of the cartridge chamber 60, a door drive shaft 64 is disposed to engage the key groove 9a of the door member, to open and close the door member 9.

The film take-up chamber 61 has a take-up spool 65 coated with rubber 65a for friction, and a press roller 66. The inner walls of the film take-up chamber 61 and the lid 61a form a smooth semi-cylindrical guide surface to guide the leading end of the photo film 6 to the take-up spool 65. A guide plate 71 is disposed above a film passageway between the cartridge chamber 60 and the film take-up chamber 61.

A reflective photo sensor or perforation sensor 67 for detecting the perforations 6b, a magnetic head 68 and an encode roller 69 are mounted on the guide plate 71 to face the photo film 6 through openings of the guide plate 71.

The magnetic head 68 makes magnetic recording on the magnetic recording layer on the photo film 6 in response to recording signals from a magnetic head driver 72. The encode roller 69 cooperates with a nip roller 73 to nip the photo filmstrip 6 and rotate along with the photo filmstrip 6 being transported from the cartridge chamber 60 to the film take-up chamber 61. The encode roller 69 has black-and-white axial stripes at regular intervals around its periphery, and a reflective photo sensor 70 detects the stripes as a reference to the film transporting speed.

A lever member 75 is disposed below the film passageway, to support the nip roller 73 and a press roller 74 for pressing the photo filmstrip 6 onto the magnetic head 68. The lever 75 is urged by a spring 77 toward a nip position shown in FIG. 9, so long as a solenoid 79 is turned on. When the solenoid 79 is turned off, the lever member 75 is locked in a retracted position wherein the nip roller 73 and the press roller 74 are set away from the photo filmstrip 6.

When recording photographic data stored in the IC memory 15 of the unit body 18 on the magnetic recording layer of the photo filmstrip 6, the photo film cartridge 2' is placed in the cartridge chamber 60 of the magnetic recording device, and the plug 57 is connected to the connector 43 of the unit body 18. Then, the operator actuates the magnetic recording device through a key board 80. First, the bar code on the bar code label 56 of the unit body 56 is decoded to enter the photo-shop ID number and the order reception number in a system controller 82 of the magnetic recording device. The system controller 82 writes the decoded data in a memory 83, and displays the decoded data on a CRT 84.

Responsive to a data transfer command through the key board 80, the system controller 82 sends a start signal to a transport control circuit 85. The transport control circuit 85 first actuates a rotary solenoid 86 to rotate the door drive shaft 64 in a direction to open the door member 9. When it is determined that the rotary solenoid 86 is properly actuated, the system controller 82 reads the data stored in the IC memory 15 through the data reader 63, including the fundamental data written in the factory, including the unit ID data and the production date data, and the photographic data recorded for each fame during the photography, including the flash data, the print format data and the clock pulse number data.

The system controller 82 stores the data read from the IC memory 15 in predetermined locations in the memory 83, and derive date-of-photograph data of each frame from the production date data and the clock pulse number data. The date-of-photograph data is also stored for each frame in the memory 83. The system controller 82 checks the data format of the data read from the IC memory 15, and sends a transport command to the transport control circuit 85. Then, the transport control circuit 85 drives a transport motor 87 in a forward direction to rotate the spool drive shaft 62 and the take-up spool 65 counterclockwise through a clutch mechanism 88. Other operation steps of the magnetic recording device shown in FIG. 9 are equal to those described with regard to the magnetic recording device of FIG. 4, so that the detailed description is omitted to avoid redundancy.

The photographic data of each frame is read to be recorded on the magnetic recording track allocated to each frame in the reversed order to the photography in the film unit. As for the frame nearest to the trailing end of the photo filmstrip 6 that is secured to the spool 7, it is convenient for photo-printing to record code data to indicate that this is the trailing frame of one filmstrip, in addition to the photographic data of the first exposed frame. This code data may be recorded on a trailing portion behind the first exposed or trailing frame.

After the photographic data is recorded in this way to the trailing end of the photo filmstrip 6, the system controller 82 outputs a rewinding command to the transport control circuit 85. Then the transport motor 87 starts being rotated in a reverse direction to rotate the spool drive shaft 62 in a direction to rewind the photo filmstrip 6 in the cartridge shell 5. In this stage, the clutch mechanism 88 disconnects the take-up spool 65 from the transport motor 87, so that the take-up spool 65 rotates along with the rewinding movement of the photo filmstrip 6. During rewinding, the system controller 82 operates the recording and reading control circuit 90 in a reproduction mode. The magnetic head 68 reads the data recorded on the magnetic recording tracks, and the data read is sent through the head driver 72 to the recording and reading control circuit 90. The recording and reading control circuit 90 collates the reproduced data with the data stored in the buffer memory 91 with reference to the output from the perforation sensor 67. Of course, the direction of data reading is reverse to the data recording direction, so that the data in the buffer memory 91 is read in the reversed order for collation.

If all the data is identical, the transport motor 87 stops in a given delay time after the take-up spool 65 stops rotating, when the film leader has been rewound into the cartridge shell 5. Thereafter, the rotary solenoid 86 rotates the door drive shaft 64 in a direction to close the door member 9, and the solenoid 79 is turned off to retract the lever 75 away from the film passageway. If there is any difference between the recorded data and the stored data, correct data is overwritten on the corresponding magnetic recording track. If necessary, all the magnetic recording tracks are rewritten.

The photo film cartridge 2' having the data magnetically recorded on the photo filmstrip 6 is subjected to the development and printing. Even though the photo filmstrip 6 is separated from the cartridge shell 5 during the development, since the latent image of the ID number bar code formed on the photo filmstrip 6 is developed concurrently with the photographic images, it is possible to correlate the photo filmstrip 6 to the cartridge shell 5 with reference to the ID number indicated by the bar code label 12.

The developed frames on the photo filmstrip 6 are seriatim subjected to printing in the order from the leading end, separately from the cartridge shell 5 with the IC memory 15, since all the necessary data is recorded on the magnetic recording layer. The printer reads the photographic data from the magnetic recording track 98a, 98b of each frame, to utilize for controlling exposure for each frame. For example, if the printer recognizes the unit ID data, a wider range of exposure correction is selected for that photo filmstrip 6. If it is indicated by the flash data that the frame is formed by flash photography, the printer may correct the exposure so that a central area of the photo-print has a proper exposure condition, assuming that the main subject is mostly located in the central area. In this way, the printer can make adequate prints while taking photographic properties of the film unit into consideration.

If the print format data designates the panoramic size, the print magnification and the paper mask size are automatically adapted to the panoramic size. Since it is unnecessary to mount any frame mask device in the film unit for designating a print format to each frame, the system of the present embodiment contributes to the cost saving of the film unit. It is also possible to marge-print the date of photography at an appropriate position and in either direction of the photo-print, in an appropriate color and size. The photo-lab data read from the leading magnetic track 96 may be printed on the back of the photo-print, so as to utilize it for managing delivery of the photo-prints from the photo-lab to the photo-shop. Moreover, it is possible to record the print format and the date of photography in association with each image on an index print that contains printed images of all frames recorded on the individual photo filmstrip. It is preferable to magnetically record exposure correction data or other kinds of print data on the opposite side of each frame from the magnetic recording track 98a or 98b having the photographic data, so that the print data may be utilized for extra-printing.

Figure 10:
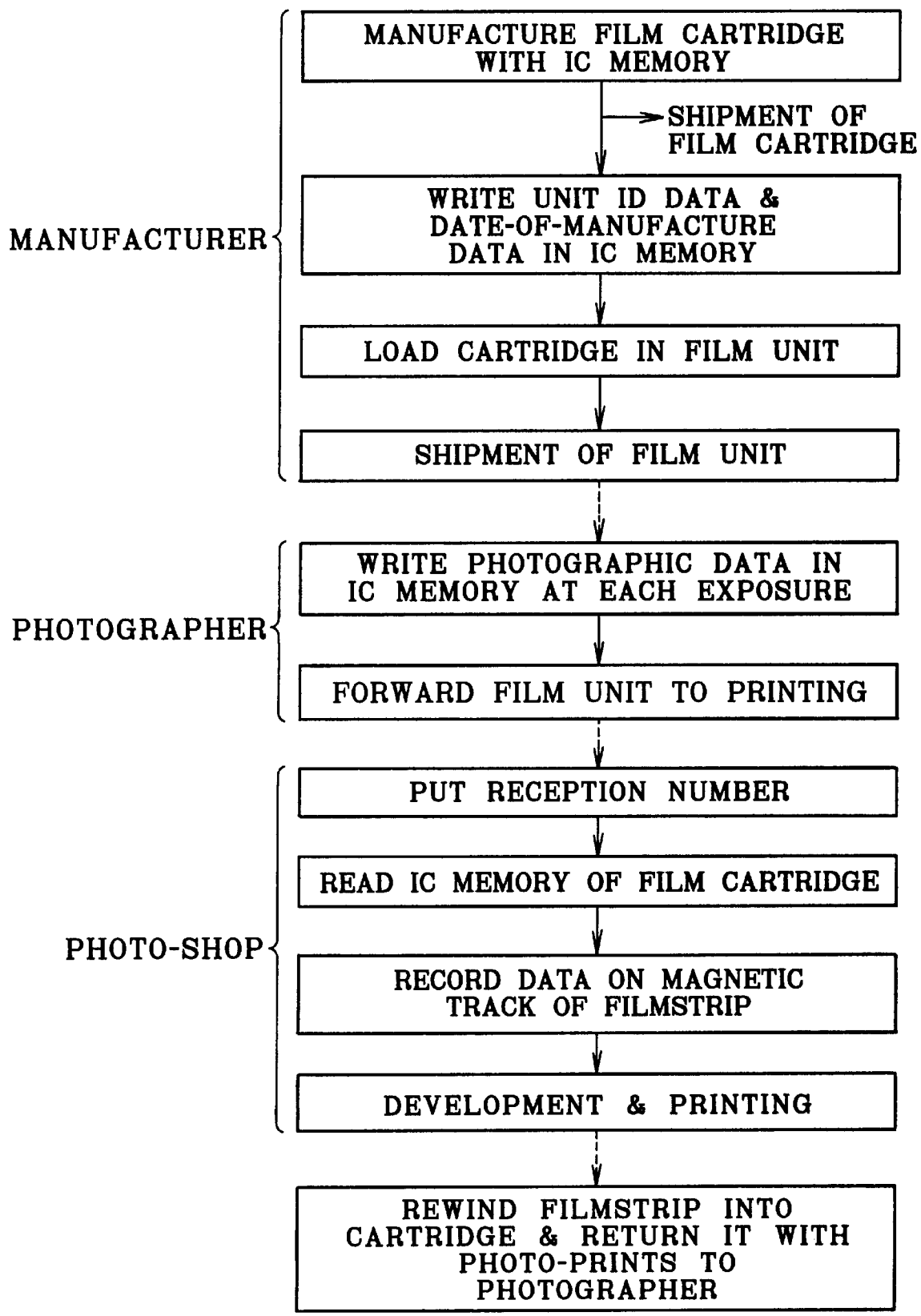
FIG. 10 is a flow chart illustrating the sequence of a photo printing system for the film unit of FIG. 6, using the magnetic data recording device of FIG. 9.

After the photographic processing in the photo-lab is accomplished, the developed photo filmstrip 6 is rewound back into the original cartridge shell 5, and is returned to the photographer through the photo-shop, together with the photo-prints made from the photo filmstrip 6. FIG. 10 shows the sequence of the photographic system for the film unit of FIG. 6. Also in this embodiment, it is possible to make the magnetic recording of the data written in the IC memory 15 after the photo filmstrip 6 is developed. Since the IC memory 15 of the original cartridge shell 5 continues to store the same data as before, the data stored in the IC memory 15 can be utilized for extra-printing.

Figure 11:
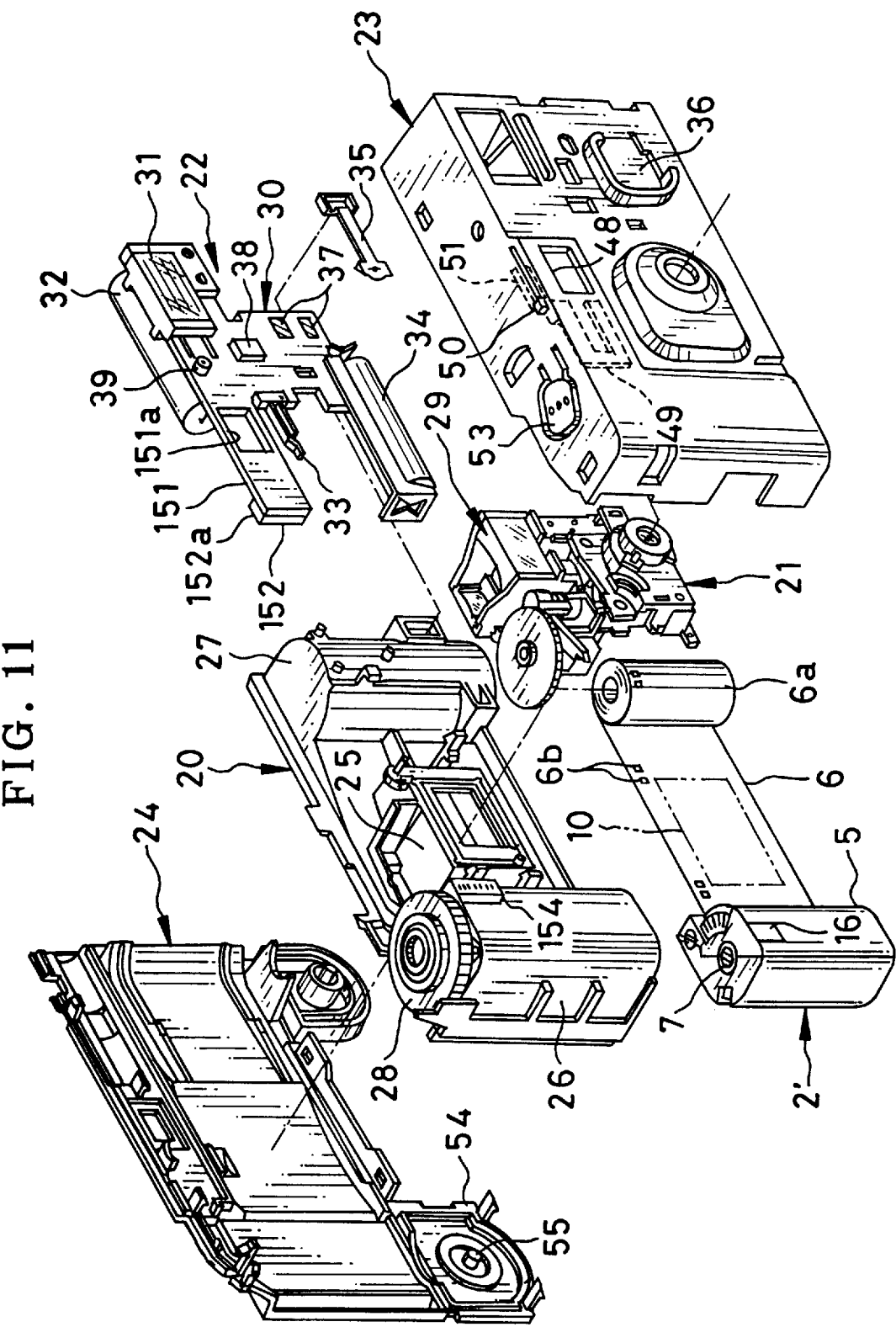
FIG. 11 is an exploded perspective view of a film unit according to a third embodiment of the present invention.

FIG. 11 shows a film unit according to a second embodiment of the invention, which contains an IX 240 type photo film cartridge 2' with a memory circuit board 16 having an IC memory 15 and a contact pattern 17. The construction of the photo film cartridge 2' is equal to that shown in FIG. 7, as designated by the same reference numbers, so that the detailed description of the photo film cartridge 2' is omitted for brevity.

As shown in FIG. 11, a unit body of the film unit fundamentally has the same construction as shown in FIG. 6, so that the following description relates only to those elements essential to this embodiment.

The unit body is mainly constituted of a body base portion 20, an exposure unit 21, a flash unit 22, a front cover 23 and a rear cover 24. The flash unit 22 is constituted of a flash circuit board 30 and a flash emitting portion 31 attached to the flash circuit board 30. On the flash circuit board 30 are mounted a main capacitor 32 for charging electric power for a flash, a synchronizing switch 33, and a AA type dry cell battery as a power source 34. When a charge switch 35 is pushed by an operation member 36 of the front cover 23 onto a switch pattern 37 formed on the flash circuit board 30, the main capacitor 32 starts being charged. The synchronizing switch 33 is turned on at the moment when the shutter mechanism is released. An output signal generated when the synchronizing switch 33 is turned on is used as a timing signal for flashing, and also as an exposure detection signal indicating that an exposure is done.

In addition to the above flash circuit, a recording control IC 38 and a reflective photo sensor 39 are mounted to the flash circuit board 30. A CPU, a program memory, a clock generator and a counter are integrated into the recording control IC 38. The counter starts counting clock pulses from the time when the power source battery 34 is connected to supply the recording control IC 38 through a booster circuit included in the flash circuit, that is, on the same date as indicated by the production date data written in the IC memory 15. The recording control IC 38 further receives the exposure detection signal from the synchronizing switch 33 at each exposure, and a flash on-off signal indicating whether a flash emission is executed or not. The photo sensor 39 has a light emitting member and a light receiving member, and is adapted to output a print format signal in cooperation with a finder mask 49, as will be described in detail later. The print format signal is also sent to the recording control IC 38.

The flash circuit board 30 further has an extension 151 extending above an exposure chamber 25 toward a cartridge chamber 26. The extension 151 has a rectangular opening 151a in an area disposed between a viewfinder optical system 29 and an objective window 48 of the front cover 23. The objective window has the standard aspect ratio of 9:16. A plug 152 is provided at an end of the extension 151 on the rear side thereof. The plug 152 has an array of connector pins 152a, and is connected to a connector 154 which is mounted on a front wall of the cartridge chamber 26, as is shown in detail in FIG. 12.

Figure 12:
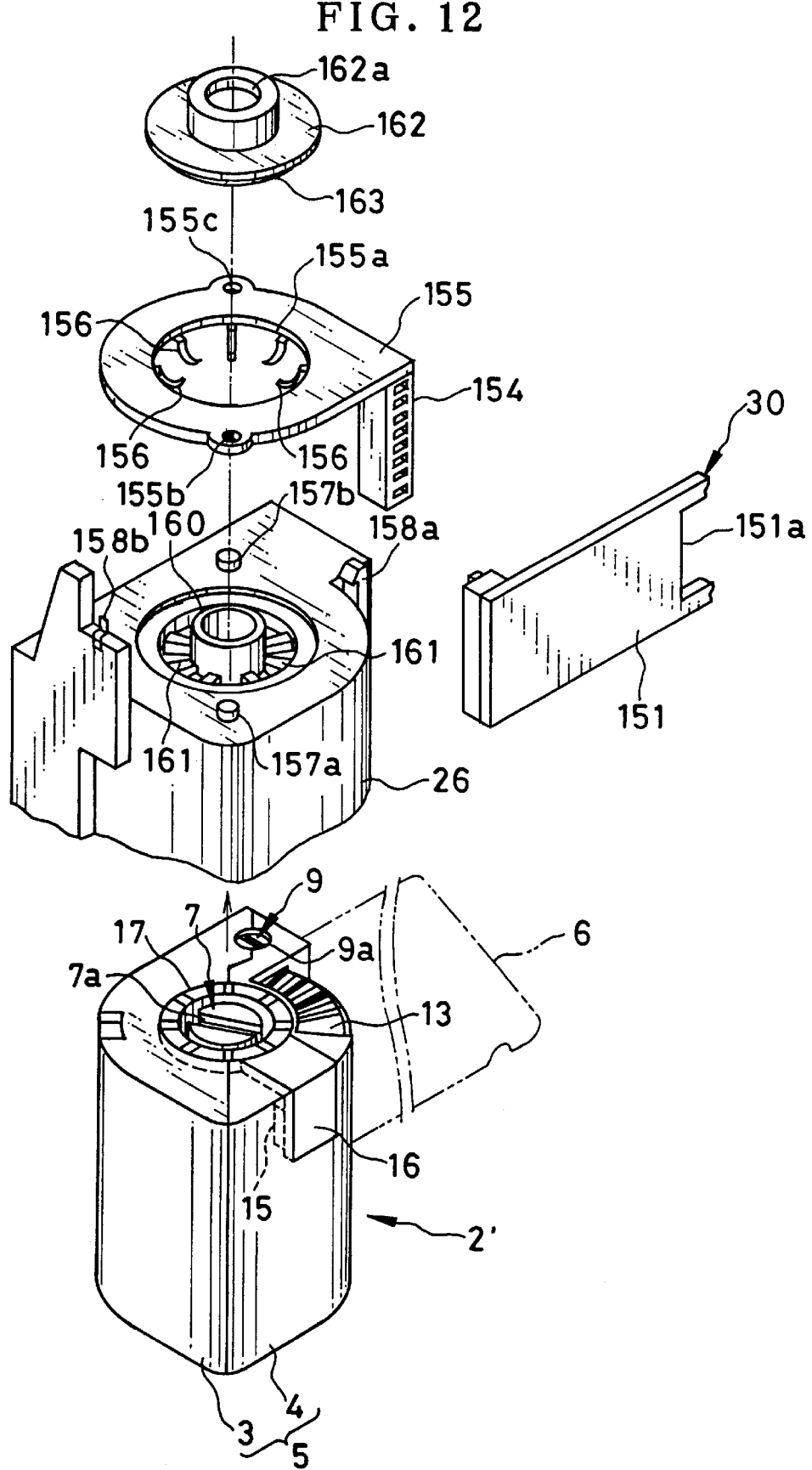
FIG. 12 is an exploded perspective view of a photo film cartridge having an IC memory, for use in the film unit of FIG. 11.

As shown in FIG. 12, the connector 154 is mounted to a connector circuit board 155 which is disposed atop the cartridge chamber 26. Because the connector 154 is oriented forward of the body base portion 20, the connection between the plug 152 and the connector 154 is made only by attaching the circuit bard 30 to the front of the body base portion 20. The connector circuit board 155 further has a circular opening 155a formed in a center thereof to avoid hindering a film advancing wheel 28. A plurality of metal contact pins 156 are mounted around a rim of the circular opening 155a to protrude radially inwardly from the rim. A circuit pattern is printed on the connector circuit board 155 to connect the metal contact pins 156 to the connector 154. A pair of holes 155b and 155c of the connector circuit board 155 are fit on bosses 157a and 157b formed on a top wall of the cartridge chamber 26, to position the connector circuit board 155. A pair of hooks 158a and 158b fasten the connector circuit board 155 to the cartridge chamber 26 in a removable fashion.

Figure 13:
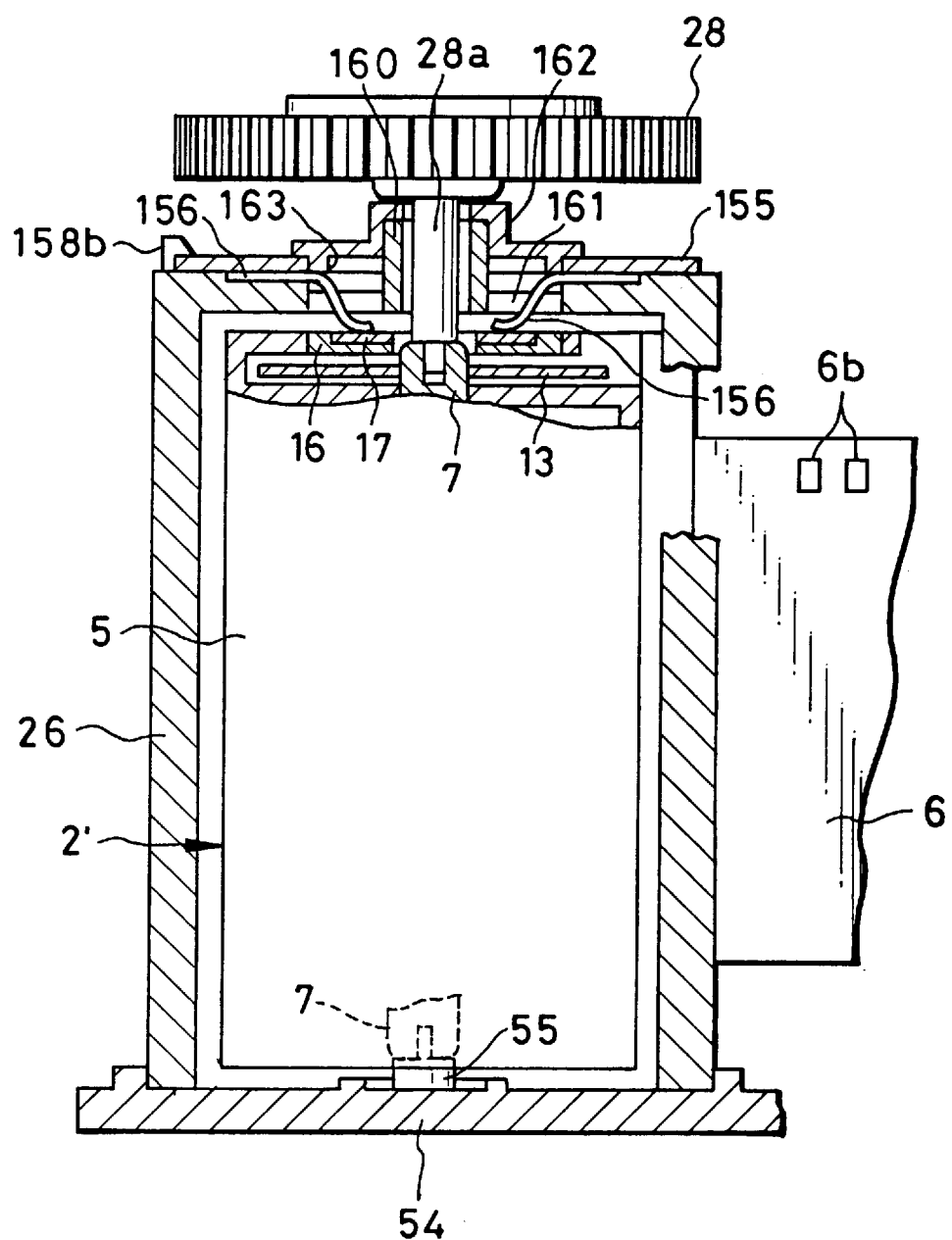
FIG. 13 is a fragmentary section of the film unit of FIG. 11, illustrating essential parts to this embodiment.

A sleeve 160 is formed through the top wall of the cartridge chamber 26 to bear the film advancing wheel 28. Slits 161 of the same number as the metal contact pins 156 are formed around the sleeve 160, to let the metal contact pins 156 protrude into the cartridge chamber 26, as is shown in FIG. 13. Thus, the metal contact pins 156 come into contact with the contact pattern 17 of the memory circuit board 16 of the cartridge shell 5. The metal contact pins 156 are arched to have a resiliency to ensure tight contact with the contact pattern 17. In this way, the recording control IC 38 on the flash circuit board 30 is connected to the IC memory 15 on the memory circuit board 16 through the plug 152, the connector 154 and the contact pins 156.

A cap 162 is fit on the sleeve 160 to cover the slits 161 in a light-tight fashion. The cap 162 has a hub 162a for accepting an axle 28a of the film advancing wheel 28, and a circular ridge 163 on its bottom surface. The circular ridge 163 is fitted into the circular opening 155a of the connector circuit board 155. The circular ridge 163 depresses the metal contact pins 156 onto the contact pattern 17 to ensure the contact between the metal contact pins 156 and the contact pattern 17.

The rear cover 24 has a bottom lid 54 for closing an open bottom of the cartridge chamber 26. The bottom lid 54 has a boss 55 to support the lower end of the spool 7 such that the cartridge shell 5 is rotatable about the spool 7 in the cartridge chamber 26. Holding the cartridge shell 5 to be rotatable around the spool 7 in the cartridge chamber 26 permits maintaining the contact pattern 17 in a proper position relative to the connector pins 156.

A signal plate 51 is formed integrally with a finder mask 49, and has a mirror surface on the rear side. When the finder mask 49 is inserted in the objective window 48, the field of view is limited to the panoramic size having an aspect ratio of about 1:2.8. Simultaneously, the signal plate 51 is moved in front of the photo sensor 39. The recording control IC 38 checks the output level of the photo sensor 39 upon each exposure detection signal from the synchronizing switch 33. When the high-reflective signal plate 51 is opposed, the output level of the photo sensor 39 changes remarkably compared with the case where the signal plate 51 is out of the front of the photo sensor 39. Therefore, the output level of the photo sensor indicates which position the finder mask 49 is located at the exposure. Thus, the field size selected at each exposure is detected by the photo sensor 39, and is written as print format data in the IC memory 15 through the recording control IC 38, the plug 152 and the connector 154. In addition to the print format data, the flash data and the clock pulse count data are written in the IC memory 15 each time a shutter button 53 is depressed to make an exposure.

When assembling the film unit, the body base portion 20 is conveyed at a constant speed on a pallet conveyer, and the exposure unit 21 is force-fitted to the front of the exposure chamber 25 in a removable fashion through hooks. Next, a connector circuit board 155 is put on atop a cartridge chamber 26, and then the cap 162 and the film advancing wheel 28 are fitted to the sleeve 160. The door drive shaft for the door member 9 may be mounted to the cartridge chamber before, after or concurrently with the mounting step of the connector circuit board 155 and the cap 162. Thereafter, the flash unit 22 is force-fitted to the front of a film roll chamber 27 in a removable fashion through hooks and, simultaneously, the plug 152 on the extension 151 of the flash circuit board 30 is inserted in the connector 154.

Then, the front cover 23, which is attached with the mask plate 49 to be slidable thereon, is secured to the front of the body base portion 20 in a removable fashion. Thereafter, the cartridge shell 5 and the photo filmstrip 6 withdrawn from the cartridge shell 5 and coiled into a roll 6a are loaded in the cartridge chamber 26 and the film roll chamber 27, respectively, in a dark room. The axle 28a of the film advancing wheel 28 is engaged with a key groove 7a of a spool 7 of the cartridge shell 5, while the contact pattern 17 of the cartridge shell 5 is brought into contact with the metal contact pins 156, to complete the electric connection between the IC memory 15 and the recording control IC 38.

The rear cover 24 is securely attached to the rear of the body base portion 20 through partial welding. Thereafter when the power source battery 34 is inserted from a bottom portion of the unit body, the recording control IC 38 starts counting the clock pulses, and the fundamental data including unit ID data and date-of-manufacture data is written in the IC memory 15. The assembled unit body is wrapped with a not-shown cardboard outer casing, and is shipped for sale after examination.

During the photography, the synchronizing switch 33 is turned on each time the shutter button 53 is depressed, regardless of whether the flash light is emitted or not. In response to the output signal from the synchronizing switch 33, the recording control IC 38 checks the output level of the photo sensor 39, and also determines whether the flash is effected or not, for example, by checking whether the main capacitor 32 is discharged or not. The recording control IC 38 writes the result of determination as flash data for each frame in the IC memory 15. In addition, the number of clock pulses counted by the counter is recorded for each frame in the IC memory 15.

After the available number of frames are photographed in the film unit, the film unit is forwarded to a photo-lab through a retail photo-shop or agency, for development and printing. In the photo-shop or in the photo-lab, the bottom lid 54 of the unit body is opened to remove the photo film cartridge 2' containing the exposed photo filmstrip 6.The photo film cartridge 2' having the data written in the IC memory 15 is subjected to the development and printing. At that time, the above described data transfer from the IC memory 15 to the magnetic recording layer of the photo filmstrip 6 may preferably be executed. After the photographic processing in the photo-lab is accomplished, the developed photo filmstrip 6 is rewound back into the original cartridge shell 5, and is returned to the user or photographer through the photo-shop, together with the photo-prints made from the photo filmstrip 6. Since the IC memory 15 of the original cartridge shell 5 continues to store the same data as before, the data stored in the IC memory 15 can be utilized for extra-printing.

The unit body separated from the photo film cartridge 2' is gathered to the manufacturer for recycling. In the recycling process, the unit body is dissembled, and the flash unit 22, the exposure unit 21 and the connector circuit board 155 are inspected for reuse. At that time, the flash unit 22 can be removed from the body base portion 20 with ease by disengaging hooks of the body base portion 20 from the flash circuit board 30 and pulling the plug 152 off the connector 154. Also, the connector circuit board 155 can be easily removed by disengaging the hooks 158a and 158b after the film advancing wheel 28 and the cap 162 are pulled off the cartridge chamber 26.

Although the flash circuit board 30 is connected to the connector circuit board 155 through the plug 152 and the connector 154 in the above embodiment, it is possible to replace the plug 152 and the connector 154 by metal contact chips made of metal foil, e.g. copper foil. That is, the metal contact chips connected to the recording control IC 38 are formed on the rear side of the extension 151 of the flash circuit board 30, whereas the metal contact chips are formed on the connector circuit board 155 such that these contact chips come into tight contact with the contact chips on the flash circuit board 30. This embodiment can be cheaper than the above plug-and-connector connection. To maintain the tight contact between the contact chips, it is preferable to secure the extension 151 to a side portion of the cartridge chamber through a hook or the like.

Although a data output portion and a data input portion for the data communication between the recording control IC 38 and the IC memory 15 are constructed by the plug 152 or 101 and the connector 154 or 102, the data communication should not be limited to the electric direct connection, but the data output and input portions can be constituted of optical devices such as an LED and a photo sensor. In that case, it is necessary to supply power to the photo sensor, but the step of connecting the plug and the connector is unnecessary.

It is possible to incorporate a connector circuit board into the cartridge chamber and expose a connector to the outside of the chamber through a side opening of the chamber. In that case, it is unnecessary to form the slits 161 for inserting the metal contact pins 156 into the cartridge chamber.

It is possible to provide the contact pattern 17 on the end face of the cartridge shell 5 that is oriented downward in the cartridge chamber, and extend a lower portion of the flash circuit board toward the cartridge chamber, to dispose a data output portion in proximity to a lower portion of the cartridge chamber. In that case, a metal contact plate for holding the power source battery 34 may be secured to the lower extended portion of the flash circuit board. Moreover, an interconnection mechanism for closing the door member 9 in cooperation with the bottom lid 54 being opened, can be mounted on the connector circuit board if it is disposed in the lower portion of the cartridge chamber. Then, the interconnection mechanism may be reused with the connector circuit board.

It is possible to replace the finder mask 49 by another view field changing device. The view field changing device may provide a third field of view having the same aspect ratio as the full size frame of 135-type. The field size selected for each frame by the view field changing device may be electrically or photo-electrically detected to record the field size as photographic data in the IC memory 15.

In the above described embodiments, one-chip microcomputer is used as the recording control IC so as to program-control the recording in the IC memory. It is alternatively possible to use a recording control IC constructed by many kinds of logic circuits and the like. An embodiment of the recording control IC of this type will be described below.

Figure 14:
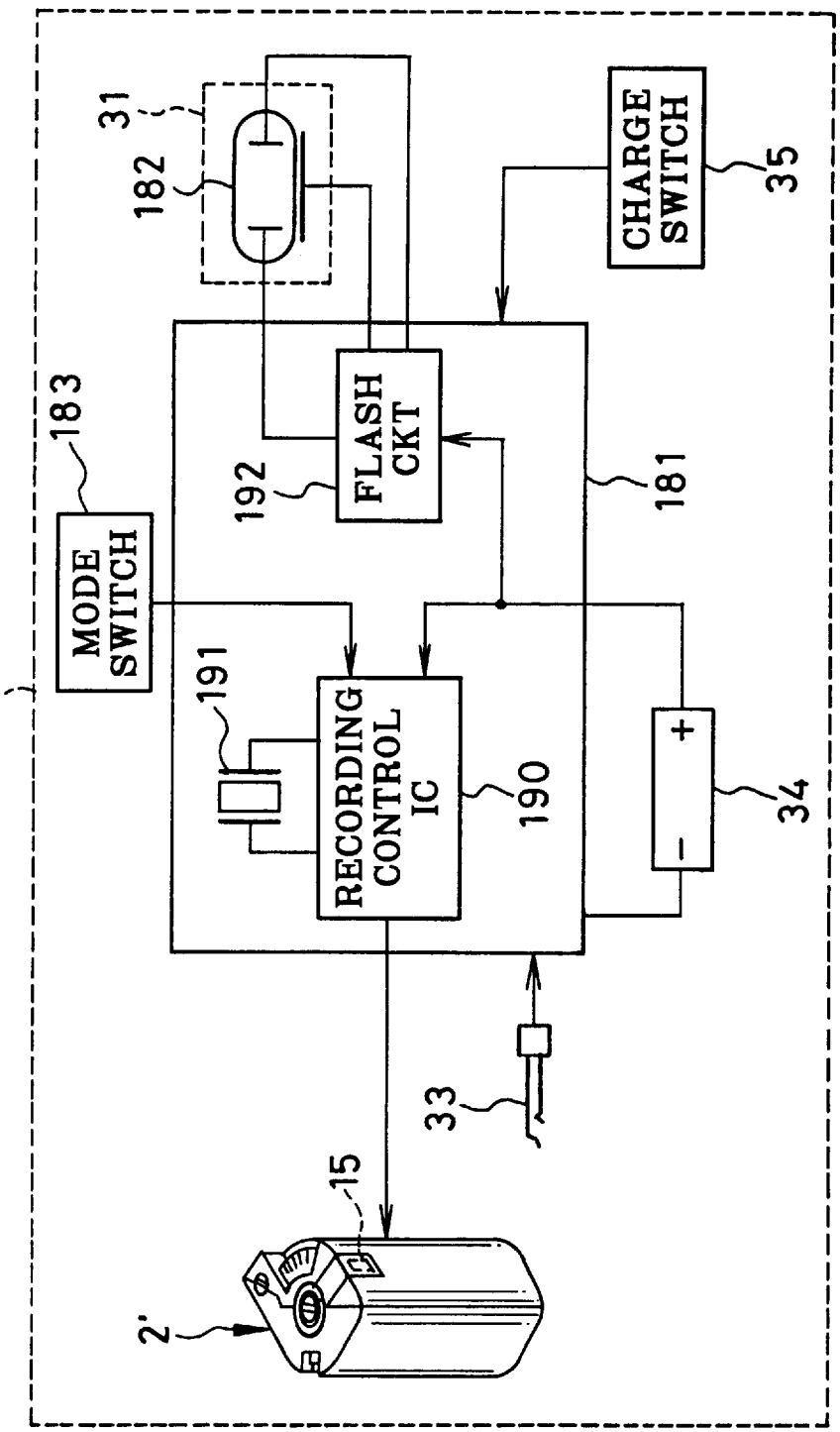
FIG. 14 is a block diagram of a circuit unit consisting of a flash circuit and a data recording circuit, according to another embodiment of the invention.

In FIG. 14 showing an electric construction of a unit body 180, a circuit unit 181 is supplied from a power source 34. A synchronizing switch 33, a xenon electronic flash lamp 182 of a flash emitting portion 31, and a mode switch 183 are connected to the circuit unit 181. The mode switch 183 is switched over in correspondence with the field of view of the viewfinder. A photo film cartridge 2' having an IC memory 15 incorporated therein is loaded in the unit body 180. The circuit unit 181 includes a recording control IC 190, a crystal resonator 191, and a flash circuit 192. The recording control IC 190 determines if the flash is emitted, and which size of view field is selected, and records flash data and view field size data as photographic data in the IC memory 15 at each exposure. The recording control IC 190 continues to count the time from the date of manufacture, and write the elapsed time in the IC memory 15 along with the photographic data.

Figure 15:
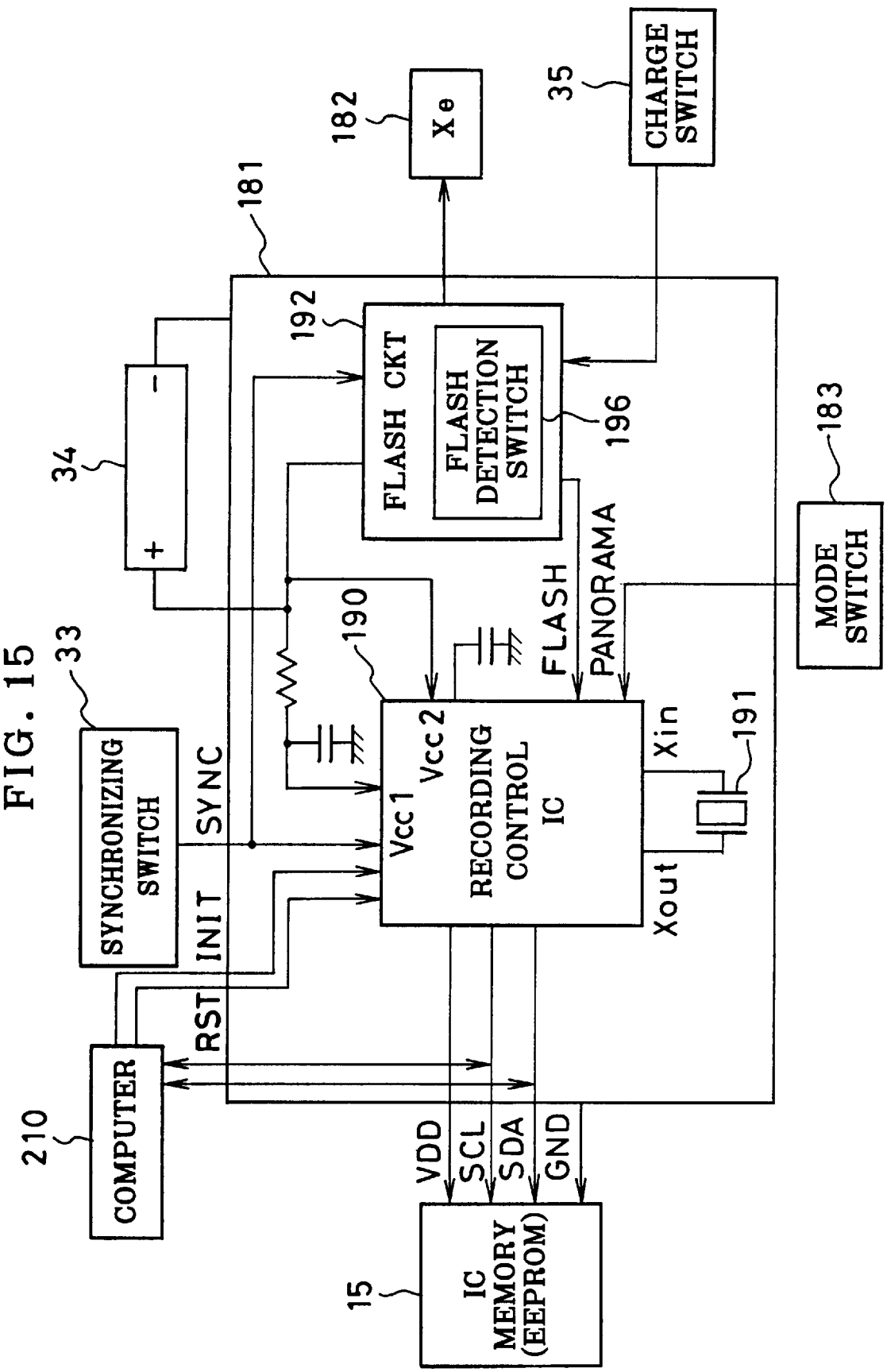
FIG. 15 is a detailed block diagram of the circuit unit of FIG. 14.
Figure 16:
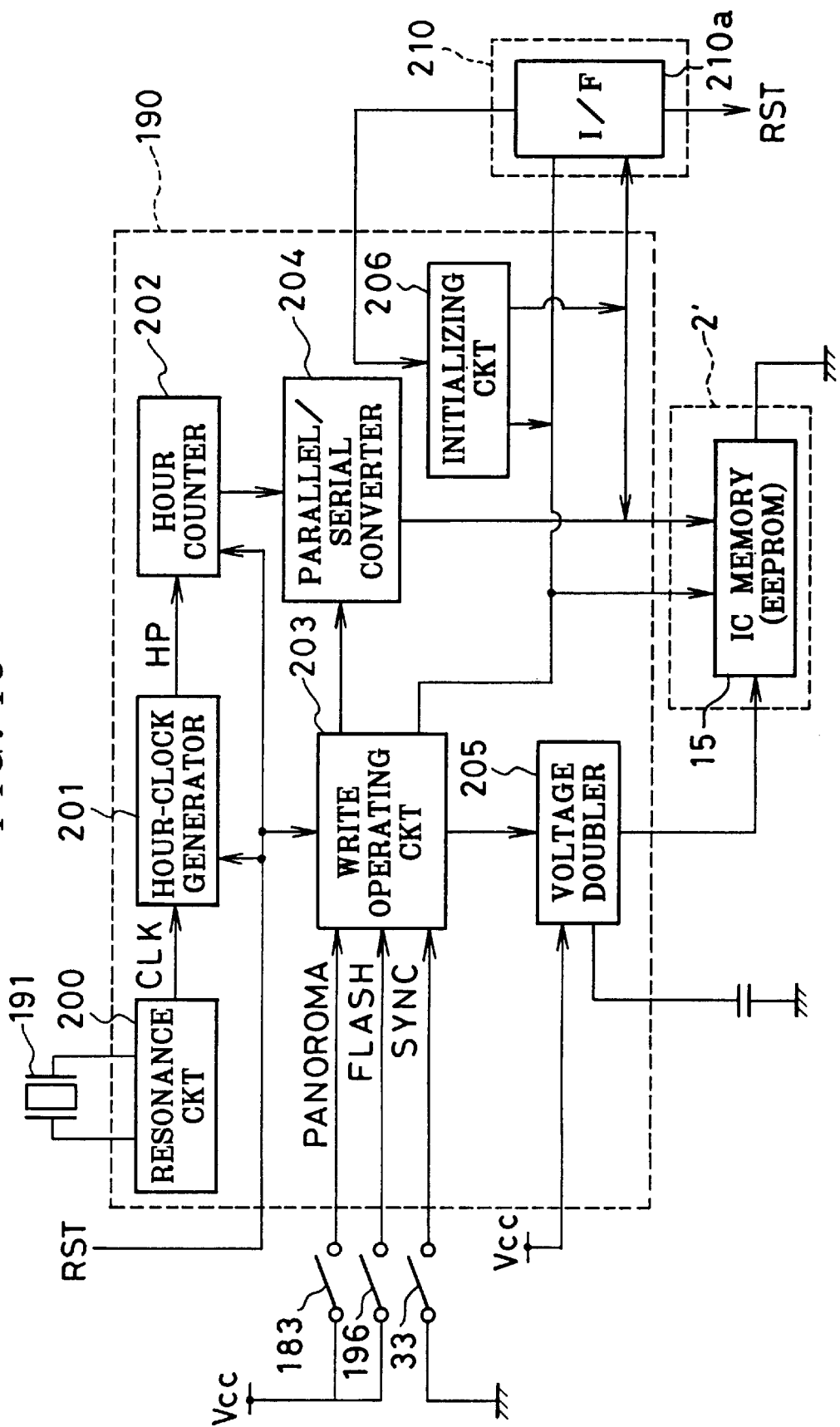
FIG. 16 is a detailed block diagram of the recording control IC of the circuit unit of FIG. 14.

FIG. 15 shows the detail of the circuit unit 181 and the peripheral circuits, and FIG. 16 shows the detail of the recording control IC 190. The power source 34 supplies a drive voltage V3, e.g. about 1 volt, to a terminal Vcc1 of the recording control IC 190, and directly supplies a power source voltage VCC of 1.5 volt, to a terminal Vcc2. The recording control IC 190 is kept being active by the drive voltage V3. The power source voltage VCC is raised up to a drive voltage VDD of 3 volt in the recording control IC 190, and the drive voltage VDD is supplied to the IC memory 15.

The mode switch 183 is turned on in cooperation with a finder mask when the finder mask is moved to change the field of view of the viewfinder from the standard size to the panoramic size. An output signal generated when the mode switch 183 is turned on is received as a panorama signal by the recording control IC 190. The flash circuit 192 includes a main capacitor, a charge circuit and a trigger circuit. The flash circuit 192 charges the main capacitor while a charge switch 35, and in response to a synchronizing signal SYNC which is generated when the synchronizing switch 33 is turned on, applies a trigger voltage to the xenon lamp 182, causing the xenon lamp 182 to flash. The flash circuit 192 further includes a flash detection circuit 196 for detecting whether the flash is effected or not. For example, the flash detection circuit 196 is a semiconductor switch which is turned on for a given time to output a flash signal to the recording control IC 190, upon the xenon lamp 182 flashing.

As shown in detail in FIG. 16, the recording control IC 190 is constituted of a resonance circuit 200, an hour generator 201, an hour counter 202, a write operating circuit 203, a parallel/serial (P/S) converter 204, a voltage doubler 205, and an initializing circuit 206. The resonance circuit 200 is connected to the crystal resonator 191, to output a clock signal CLK at a constant frequency to the hour generator 201. The hour generator 201 is constructed by a multiple asynchronous binary counter which divides the frequency of the clock signal to output an hour-clock pulse HP at every hour to the hour counter 202. The hour counter 202 is reset to zero in a manufacturing process by an external reset signal RST, and is able to count the time elapsed from the manufacture, for example, up to 32,768 hours, that is, about 3.7 years. The elapsed time data or hour count data from the hour counter 202 is sent in parallel to the P/S converter 204. The reset signal RST is also applied to the hour-clock generator 201 and the write operating circuit 203 to initialize them simultaneously with the reset of the hour counter 202.

The write operating circuit 203 controls writing in the IC memory 15 of the photo film cartridge 2'. The write operating circuit 203 determines if the panorama signal and the flash signal are entered a certain time after the synchronizing signal SYNC is entered. The write operating circuit 203 sends the photographic data corresponding to the result of the determination, to the P/S converter 204. Simultaneously with writing the photographic data, the write operating circuit 203 activates the voltage doubler 205. Also, the write operating circuit 203 outputs a latch signal to the P/S converter 204 upon receipt of the synchronizing signal SYNC, to set the elapsed time data from the hour counter 202 in the P/S converter 204.

The voltage doubler 205 is activated by the write operating circuit 203 only while writing the IC memory 15. The voltage doubler 205 is connected to the battery 34 through the terminal Vcc2, to convert the power source voltage VCC into the drive voltage VDD for the IC memory 15, so that the power of the battery 34 is efficiently utilized.

The P/S converter 204 converts the photographic data from the write operating circuit 203 and the elapsed time data from the hour counter 202 into serial data SDA and sends it to the IC memory 15. The write operating circuit 203 receives a clock signal which is obtained by dividing the clock signal from the resonance circuit 200. The clock signal is sent as synchronizing clock SCL from the write operating circuit 203 to the IC memory 15. Synchronously with the synchronizing clock SCL, the serial data from the P/S converter 204 is written one bit after another.

The initializing circuit 206 initializes the IC memory 15 in response to an initializing signal INIT which is entered by an external device in a manufacturing step. The IC memory 15 is EEPROM which is driven by the voltage of 3 volt (=VDD). The write operating circuit 203 counts the address for each frame and for each kind of data written in the IC memory 15, and sends the count of the address through the P/S converter 204 to the IC memory 15, so as to write the data in a designated address.

An interface (I/F) circuit 210a of an external computer 210 is connected to a not-shown interface port of the circuit unit 81. Through this I/F circuit 210a, the computer 210 enters first the initializing signal INIT to initialize the IC memory 15, and then enters the reset signal RST to initialize or reset the hour-clock generator 101, the hour counter 102 and the write operating circuit write operating circuit 203 in the manufacturing step. The date and time of the initialization is written as the date-of-manufacture data in the IC memory 15 as fundamental data, in addition to unit ID data. A command for reading or writing the IC memory 15 is entered by operating the computer 210.

Figure 17:
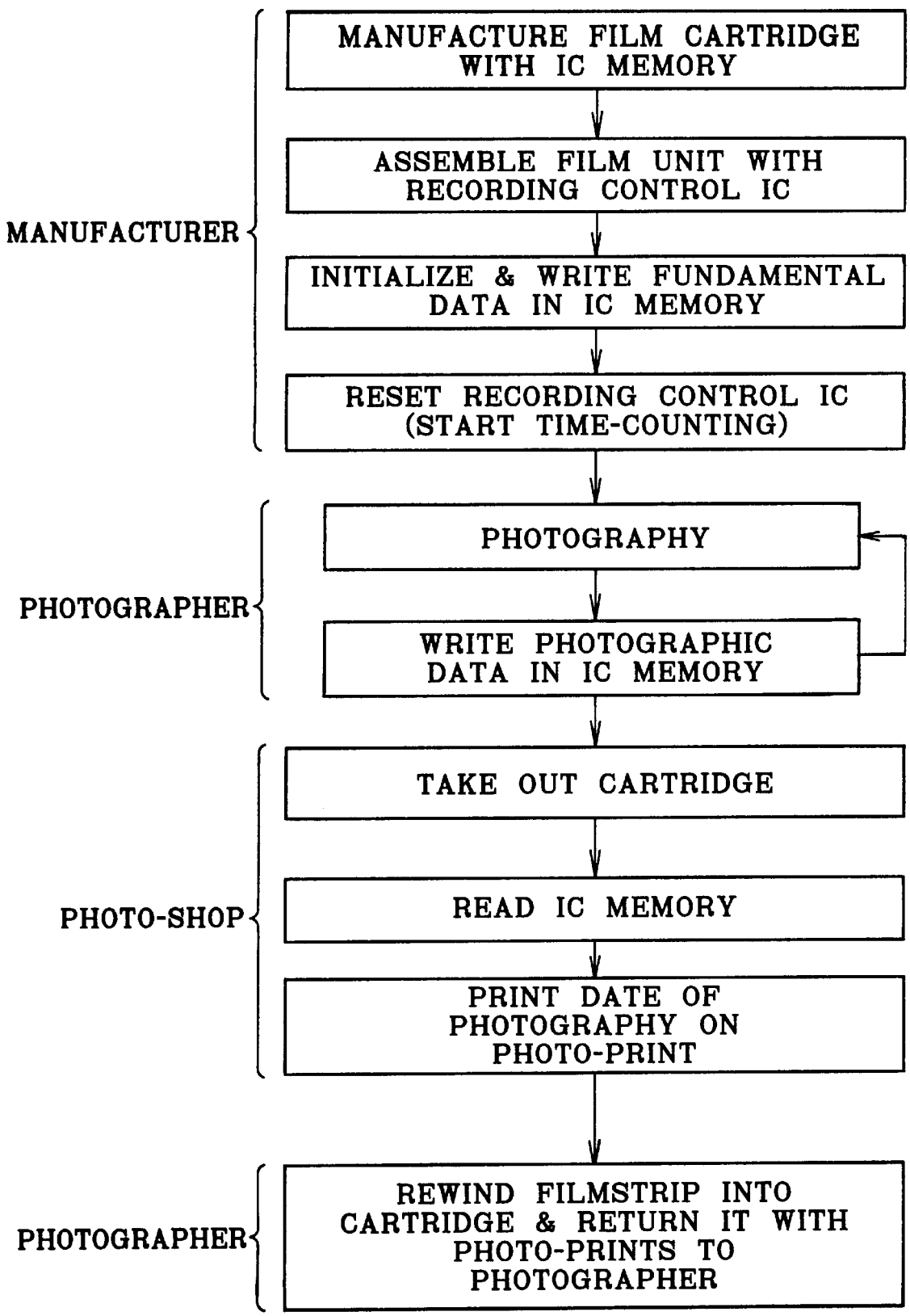
FIG. 17 is a flow chart illustrating the sequence of a photo printing system for the film unit of FIG. 11.

FIG. 17 shows the sequence of the photographic system for the film unit of this embodiment. The recording control IC according to the embodiment shown in FIGS. 14 to 17 is applicable to recording the IC memory 14 of the embodiment shown in FIG. 1.

Although the present invention has been described with respect to the film units shown in the drawings, the present invention is applicable to a camera having no magnetic recording device. Even for a camera having a magnetic recording device, the present invention would improve efficiency and density of magnetic recording on the photo filmstrip.

Although the unit ID data is recorded on the magnetic recording track of each frame in the above described embodiments, it is possible to record the unit ID data on the leading magnetic recording track 96 alone, since the unit ID data is common to all the frames of the photo filmstrip exposed in the film unit. However, since the IX 240 type photo film cartridge permits being transferred between cameras before all available frames are exposed, camera ID data is assumed to be magnetically recorded by each frame. In order to process the photo film cartridges exposed in the film units together with those exposed in the cameras in the photo-lab, it is desirable to record the unit ID data by each frame. If the camera with the magnetic recording device is adapted to record flag data on the magnetic recording layer to indicate whether or not the photo film cartridge is unloaded before the completion of exposure of all available frames, it is preferable to write in the IC memory 15 or 14 in advance in a manufacturing step of the film unit, to indicate that photo film cartridge contained in the film unit is not transferred.

If the user forwards the photo film cartridge 2' or the film unit to the photo-shop, ordering the printing, before all available frames have been exposed, the IC memory 15 or 14 stores merely the photographic data of the exposed frames. For example, when the number of available frames is 40, while the number of exposed frames is 30, the system controller 82 skips recording on the magnetic recording tracks 98a, 98b . . . of leading ten frames with reference to the perforations 6b, following the recording on the leading magnetic track 96. Thereafter, the system controller 82 restarts recording from the magnetic track of the eleventh frame in the order from the leading end, that is, the last exposed frame in this instance. It is possible to record data on the leading magnetic track 96, to indicate that 30 of the 40 available frames are exposed.

As described so far, the present invention should not be limited to the above described embodiments but, on the contrary, various modification may be possible to those skilled in the art without departing from the scope of claims attached hereto.

What is claimed is:

1. A method of recording data on a magnetic recording layer of a photo filmstrip which is exposed in a lens-fitted photo film unit, comprising the steps of:

A. writing data in an IC memory at each exposure through a data recording device, said IC memory and said data recording device being provided in a unit body containing said photo filmstrip and a cartridge shell;

B. winding said photo filmstrip into said cartridge shell one frame after each exposure;

C. removing said cartridge shell containing a full length of said photo filmstrip therein from said unit body;

D. reading said data from said IC memory of said unit body by an external device connectable to an interface terminal of said data recording device, which is exposed to outside of said unit body; and E. recording said data by said external device on said magnetic recording layer of said photo filmstrip before printing.

2. A method according to claim 1, further comprising the step of writing data specific to said lens-fitted photo film unit in said IC memory during manufacturing.

3. A method according to claim 1, wherein said cartridge shell is able to advance a leader of said photo filmstrip to outside of said cartridge shell in response to rotation of a spool of said cartridge shell in an unwinding direction, and wherein said step E is executed while said photo filmstrip being withdrawn from and then rewound back into said cartridge shell.

4. A lens-fitted photo film unit containing a cartridge shell in a cartridge chamber and a roll of photo filmstrip in a film roll chamber such that said photo filmstrip is wound into said cartridge shell one frame after each exposure, said lens-fitted photo film unit comprising:

an IC memory incorporated into said cartridge shell;

an interconnection device mounted to said cartridge chamber, said interconnection device being connected to said IC memory of said cartridge shell contained in said cartridge chamber, and having an external terminal exposed to an exterior of said cartridge chamber;

a flash circuit board having a flash circuit of a built-in flash device mounted thereon, said flash circuit board being attached to a front of said film roll chamber;

a data recording circuit mounted on said flash circuit board, for recording data in said IC memory, said data recording circuit having an extension extending from said flash circuit board toward said cartridge chamber; and a data output terminal disposed on a tip of said extension, for outputting said data to said external terminal of said interconnection device through a contact connection or a non-contact connection.

5. A lens-fitted photo film unit according to claim 4, wherein said data output terminal and said external terminal are connected through a plug-in connection.

6. A lens-fitted photo film unit according to claim 4, wherein said extension is formed integrally with said flash circuit board.

7. A lens-fitted photo film unit according to claim 4, wherein said interconnection device comprises a printed circuit board attached to said cartridge chamber in a removable fashion, a plurality of metal contact pins mounted to said printed circuit board and protruding into said cartridge chamber to contact a contact member of said cartridge shell connected to said IC memory, and said external terminal formed integrally with said printed circuit board.

8. A lens-fitted photo film unit according to claim 7, wherein said contact member is disposed on an end face of said cartridge shell that is oriented upward in said cartridge chamber, and said printed circuit board is mounted on a top wall of said cartridge chamber, at least an opening being formed through said top wall of said cartridge chamber to inlet said metal contact pins.

9. A lens-fitted photo film unit according to claim 7, wherein said external terminal of said interconnection device is oriented forward of said lens-fitted photo film unit, and said data output terminal of said data recording device is oriented rearward of said lens-fitted photo film unit, such that said data output terminal is connected to said external terminal only by attaching said flash circuit board to the front of said film roll chamber.

10. A lens-fitted photo film unit containing a cartridge shell in a cartridge chamber and a roll of photo filmstrip in a film roll chamber such that said photo filmstrip is wound into said cartridge shell one frame after each exposure, said lens-fitted photo film unit comprising:

an IC memory incorporated into said cartridge shell;

an interconnection device mounted to said cartridge chamber, said interconnection device being connected to said IC memory of said cartridge shell contained in said cartridge chamber, and having an external terminal exposed to an exterior of said cartridge chamber;

a flash circuit board having a flash circuit of a built-in flash device mounted thereon, said flash circuit board being attached to a front of said film roll chamber;

a print format selection device manually operable to select a print format of each frame before each exposure;

a print format detection device for detecting the print format selected by said print format selection device; and a data recording circuit mounted on said flash circuit board, said data recording circuit being connected to said print format detection device, to a synchronizing switch which is turned on at each exposure, and to said external terminal of said interconnection device, so as to record data representative of the selected print format of each frame in said IC memory synchronously with each exposure.

11. A lens-fitted photo film unit according to claim 10, wherein said IC memory is an EEPROM.

12. A lens-fitted photo film unit according to claim 10, wherein said print format selection device comprises a finder mask which may be inserted in and removed from a field of a viewfinder of said film unit, and said print format detection device comprises a photo sensor for detecting the position of said finder mask.

13. A lens-fitted photo film unit according to claim 10, further comprising a flash detection device for detecting whether said flash device is actuated or not, said flash detection device being connected to said data recording circuit so as to record the result of detection of said flash detection device in said IC memory.

14. A lens-fitted photo film unit according to claim 10, wherein said photo filmstrip has a magnetic recording layer on a back surface reverse to a photosensitive emulsion layer, whereas said cartridge shell is able to advance a leader of said photo filmstrip to outside of said cartridge shell in response to rotation of a spool of said cartridge shell in an unwinding direction.

15. A lens-fitted photo film unit containing a cartridge shell in a cartridge chamber and a roll of photo filmstrip in a film roll chamber such that said photo filmstrip is wound into said cartridge shell one frame after each exposure, said lens-fitted photo film unit comprising:

a flash circuit board having a flash circuit of a built-in flash device mounted thereon;

a print format selection device manually operable to select a print format of each frame before each exposure;

a print format detection device for detecting the print format selected by said print format selection device;

a data recording device including an IC memory, said data recording device being mounted on said flash circuit board, and connected to a synchronizing switch which is turned on at each exposure and to said print format detection device, so as to record data of the selected print format in said IC memory synchronously with each exposure; and an interface terminal mounted on said flash circuit board and exposed to outside of said lens-fitted photo film unit, for allowing an external device to access to said IC memory.

* * * * *